(12) United States Patent
Schrempp et al.

(10) Patent No.: US 10,929,327 B1
(45) Date of Patent: Feb. 23, 2021

(54) EXPANSION DEVICE HOUSING MULTIPLE COMPONENTS

(71) Applicant: ZT Group Int'l, Inc., Secaucus, NJ (US)

(72) Inventors: Michael Schrempp, Bainbridge Island, WA (US); Chen An, Bogota, NJ (US); Zichun Song, Saddle Brook, NJ (US); Raphael Deng, Secaucus, NJ (US); Kevin R. Qualters, North Haledon, NJ (US); Jonah Dunham, Seattle, WA (US)

(73) Assignee: ZT Group Int'l, Inc., Secaucus, NJ (US)

( * ) Notice: Subject to any disclaimer, the term of this patent is extended or adjusted under 35 U.S.C. 154(b) by 77 days.

(21) Appl. No.: 15/049,977

(22) Filed: Feb. 22, 2016

(51) Int. Cl.
*G06F 13/40* (2006.01)
*G06F 13/42* (2006.01)
*G06F 1/18* (2006.01)

(52) U.S. Cl.
CPC .......... *G06F 13/4068* (2013.01); *G06F 1/185* (2013.01); *G06F 13/4022* (2013.01); *G06F 13/4282* (2013.01)

(58) Field of Classification Search
CPC ........ G06F 21/85; G06F 1/185; G06F 3/0688; G06F 3/0683; G06F 13/4022; G06F 13/4068; G06F 13/4282; G06F 13/4045; H04L 67/12; G07C 5/008; H05K 7/1487; H05K 7/1489
See application file for complete search history.

(56) References Cited

U.S. PATENT DOCUMENTS

| | | | |
|---|---|---|---|
| 10,467,163 B1 * | 11/2019 | Malwankar | H04L 49/356 |
| 2013/0201316 A1 * | 8/2013 | Binder | H04L 67/12 348/77 |
| 2016/0073544 A1 * | 3/2016 | Heyd | G11B 33/128 361/679.31 |
| 2016/0335220 A1 * | 11/2016 | Breakstone | G06F 13/4282 |
| 2017/0220505 A1 * | 8/2017 | Breakstone | G06F 13/16 |
| 2019/0034124 A1 * | 1/2019 | Worley | G06F 3/0688 |

* cited by examiner

*Primary Examiner* — Ernest Unelus
(74) *Attorney, Agent, or Firm* — Dergosits & Noah LLP; Todd A. Noah

(57) ABSTRACT

An expansion device is disclosed for including a plurality of modular devices within a pre-defined volume, such as the drive bay of a computing device. The expansion device may include a standardized bus connection and circuitry connecting to a controller chip, circuitry electrically coupling the controller chip to a plurality of modular devices, and a housing that houses the controller chip, connecting circuitry, and modular devices and that fits within the pre-defined volume.

14 Claims, 20 Drawing Sheets

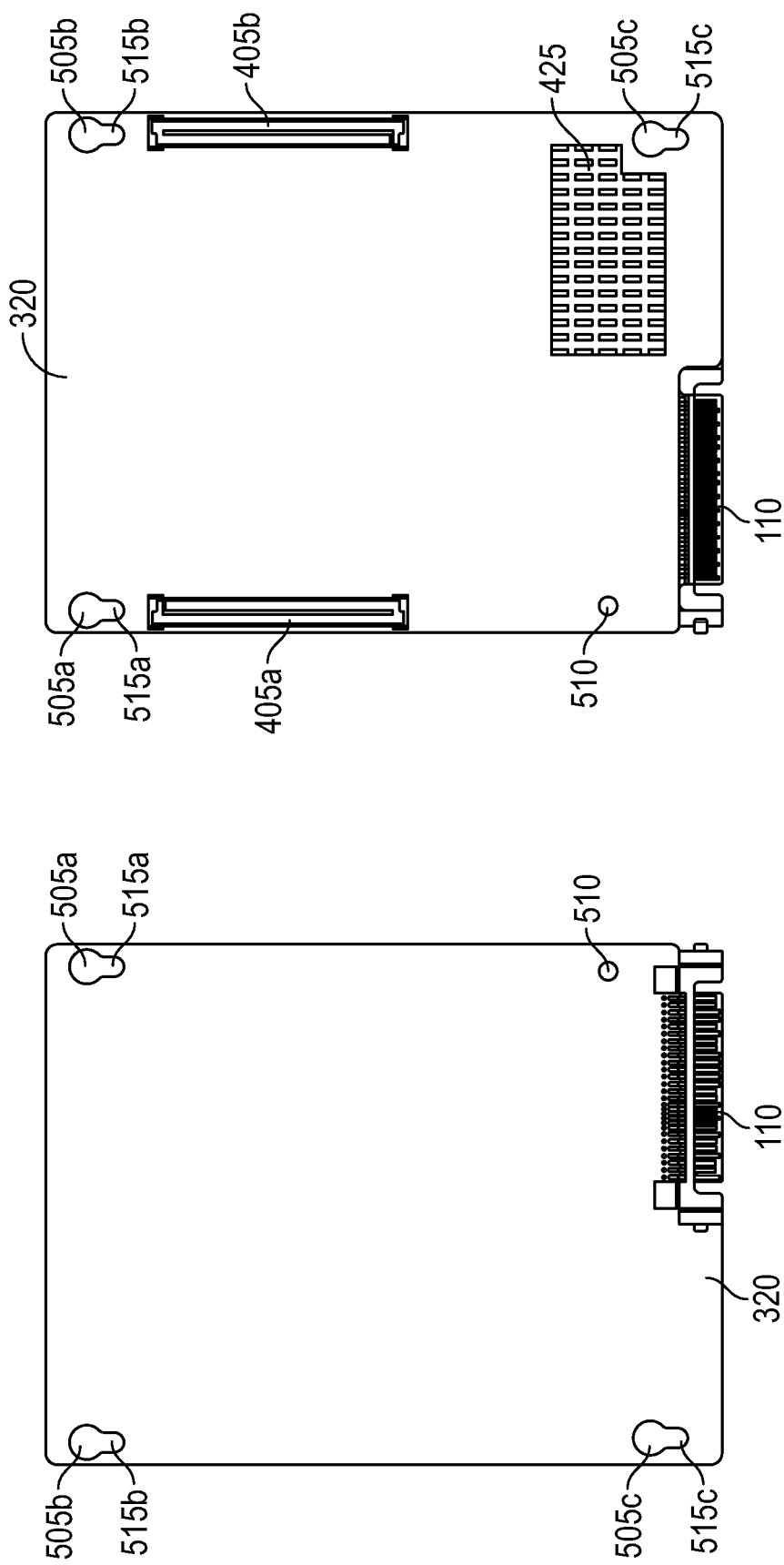

US 10,929,327 B1

EXPANSION DEVICE HOUSING MULTIPLE COMPONENTS

BACKGROUND

A drive bay is a standardized volume in a computer device for adding hardware. The hardware typically includes peripheral computer devices, such as data storage devices. Historically, data storage devices have included floppy disks, hard-disk drives (HDDs), CDs, and DVDs. The drive bay has shrunk from early 8" drives, to the 5.25" inch drive of early PCs in the 1980s, to current 3.5", 2.5", and 1.8" drives. The designation of the drive bay size does not itself define the volume occupied by the drive bay. Rather, the designation of the drive bay size reflects the size of the storage medium contained by the drive bay. For example, a 3.5" drive bay is named for a dimension of the HDD diskette contained within a 3.5" HDD. A 3.5" drive bay has actual dimensions of 4" wide by 1" high. Today's computer desktops and towers typically employ 2.5" and 3.5" drives, more typically the 3.5" drive."

The peripheral device in a drive bay typically communicates with the computer device through an interface. For example, an HDD may employ a serial SCSI (SAS) or serial ATA (SATA) standard interface.

Like the drive bay size, peripheral devices and interfaces have evolved. For example, Solid State Drives (SSDs) are data storage devices using integrated circuits, rather than magnetic disks, to store data. The integrated circuits do not use moving mechanical components like spinning disks or read/write heads. SSDs typically have a read latency of less than 100 microseconds compared to a typical HDD read latency of milliseconds. For these reasons, when compared to traditional HDDs, SSDs are usually faster (shorter access time and latency), quieter, more physically robust, smaller, lighter, and consume less power. SSDs, however, are usually more expensive for the same amount of storage.

Nevertheless, SSDs are replacing HDDs in increasing frequency. SSDs may be organized using a redundant array of independent disks (RAID) format or scheme in nested levels such as, for example, RAID 16+1 and so on. As a result, one or more SSDs may directly replace a computer's HDD or may function as a cache of the HDD.

The improvement in access time and latency of the SSD over the HDD mean that HDD interfaces, such as the SAS and SATA interfaces, are not optimal for SSDs because these interfaces cannot take full advantage of the improved features of the SSD.

The Peripheral Component Interconnect Express (PCIe) standard is a high-speed serial computer expansion bus standard intended to replace older bus standards, such as SAS and SATA. PCIe is also known as PCIE and PCI Express. Other older bus standards include PCI, PCI-X, FireWire, RapidIO, and AGP. A PCIe switch supports the PCIe standard.

PCIe has advantages over the older bus standards that make it more optimal for an SSD. Among the PCIe advantages are: higher bus throughput, better scaling for connected bus devices, better error detection and reporting, hot-plug capability, and lower connector pin counts and the resulting smaller connector dimensions.

PCIe (like older bus standards) accommodates numerous types of devices—the SSD is merely an example. And there exist devices, which when installed in a host computing device may perform better in particular orientations with respect to the host. For example, an SSD may have a preferred orientation for heat-dissipation given an existing airflow in the drive bay of a host computer, and a GPS device may have a preferred orientation for antenna placement relative to the host itself or relative to other devices contained by the host.

Therefore, with the persistence of the drive bay in computing devices and the advent of improved devices and improved bus standards, there exists a need for an expansion device to accommodate devices in a volume allocated to a drive bay. Also, for a device that has a preferred orientation, there exists a need for an expansion device that provides a plurality of alternative configurations for such a device.

BRIEF DESCRIPTION OF THE DRAWINGS

FIG. 5a is a bottom view illustrating a circuit board of an embodiment;

FIG. 5b is a top view illustrating a circuit board of an embodiment;

DETAILED DESCRIPTION

The subject matter discloses an expansion device that allows the use of multiple devices (or "modules" or "modular devices") in a pre-defined volume ("form factor" or "space"). In an embodiment, the form factor may be that of the 3.5" drive bay. In an embodiment, the expansion device may use a PCIe switch to accommodate multiple PCIe modules. In an embodiment, PCIe modules may include standard M.2 SSD modules. In an embodiment, the expansion device may allow for the tool-less removal and installation of the added devices. In an embodiment, the expansion device may provide at least two alternative configurations in which the modular devices may be oriented relative to the expansion device.

Embodiments of the expansion device allow multiple PCIe devices to be operably housed within a housing that utilizes the form factor of a 3.5" HDD or drive bay. An embodiment provides a PCIe switch and connecting circuitry to fan out the incoming "upstream" PCIe lanes to multiple "downstream" PCIe devices. The PCIe switch, connecting circuitry, and multiple PCIe devices are mounted on one or more circuit boards and enclosed in a multi-part housing. In an embodiment, the PCIe devices are on a separate, removable board within the housing, but embodiments with one board or more than two boards are envisioned. In an embodiment, six M.2 SSD modules are packaged in a housing fitting the 3.5" form factor.

Embodiments of the expansion device thus eliminate the need to redesign computer or server systems that use 3.5" drive bays or HDDs in order to implement small PCIe devices, such as a solid-state drives. But, embodiments contemplate that PCIe devices of any type, other form factors, and other bus standards may be used without departing from the scope of the subject matter of this disclosure.

In an embodiment, the mechanical design allows for easy access to the internal components for assembly, replacement, or repair. This includes features that allow the parts of the housing to be opened and internal parts to be removed without tools.

Figure 1:
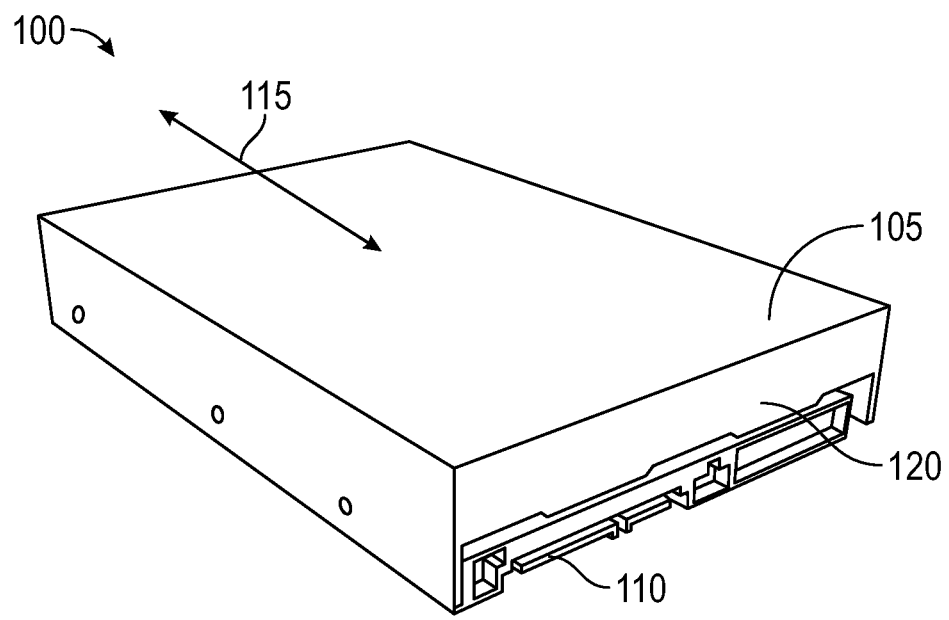
FIG. 1 is a perspective drawing illustrating an embodiment.

FIG. 1 is a perspective drawing illustrating an embodiment. In FIG. 1 an expansion device 100 includes a housing 105 and a device connector 110. Housing 105 includes a housing face 120. Housing 105 may be dimensioned to fit a pre-defined volume (length, width, height). For example, a pre-defined volume may be a standardized drive bay size, including, for example, 5.25", 3.5", 2.5", and 1.8" drive bays. Device connector 110 may be a standardized bus connector and may be positioned with respect to housing face 120 according to a standard as well. Device connector 110 is for connecting expansion device 100 to a central processing unit (CPU) of a computing device, such as a personal computer, server, tablet, or smart phone. An arrow 115 indicates potential directions for airflow through housing 105. The airflow may be in either direction based on an underlying configuration of a host computing device, which may include, for example, personal computers and servers. Housing face 120 may include holes, perforations, or other openings that facilitate airflow (e.g., see FIG. 7, elements 730, 735). In an embodiment, housing 105 is dimensioned to fit a 3.5" drive bay, connector 110 is a PCIe bus connector (e.g., a SAS-PCI Express (SFF-8639) connector), and housing face 120 is substantially open, minimizing the resistance to airflow. Thus, the mechanical parameters for expansion device 100 may be that it fit within a defined volume and have a standardized electrical connector placed in a pre-defined location.

Figure 2:
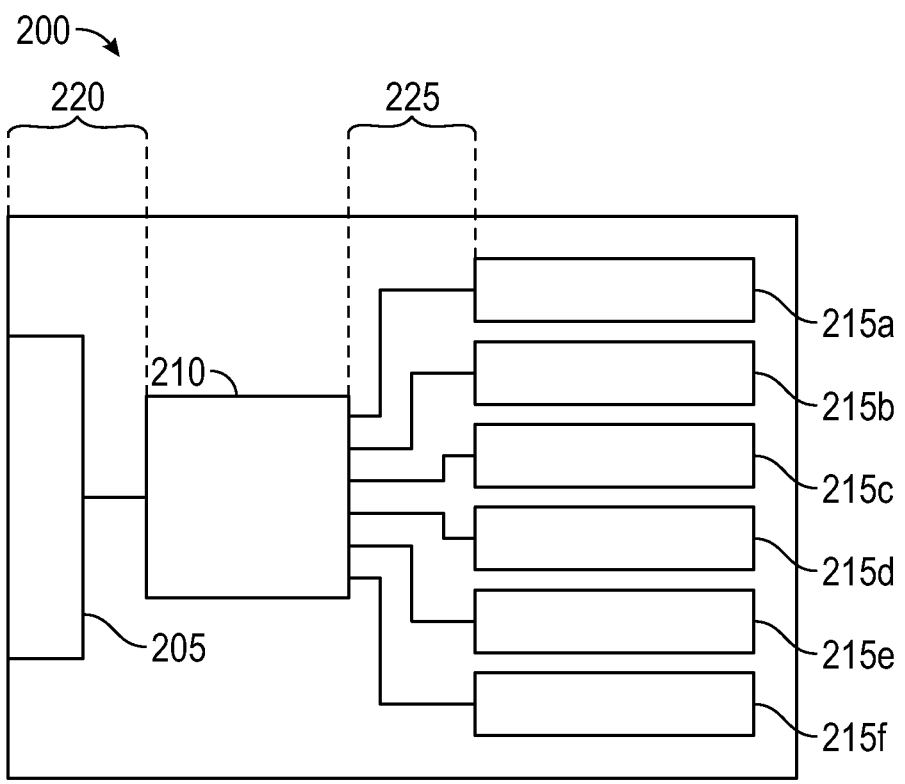
FIG. 2 is a schematic drawing illustrating a system according to an embodiment.

FIG. 2 is a schematic drawing illustrating a system for an expansion device according to an embodiment. In FIG. 2 an expansion system 200 includes a device connector 205, a controller chip 210, a plurality of modular devices 215a, 215b, 215c, 215d, 215e, 215f (collectively "215a-f," note: this type shorthand notation will be used throughout this disclosure to denote such a series of elements), connecting circuitry 220 (which includes device connector 205), and connecting circuitry 225 (which includes connectors to connect to modular devices 215a-f). Connecting circuitry 220 is for connecting controller chip 210 to a central processing unit (CPU) of a computing device, such as a personal computer, server, tablet, or smart phone. Device connector 205, like device connector 110, may be a standardized bus connector. Connecting circuitry 225 connects controller chip 210 to modular devices 215a-f.

Generally, connecting circuitry 220 and 225 are for connecting modular devices 215a-f, controller chip 210 and a host computer device while meeting the electrical specifications of the interfaces between the components and the components themselves.

One of skill will understand that system 200 may be implemented using one or more circuit boards and that the elements of system 200 may be arbitrarily located on the one or more circuit boards. For example, elements of connecting circuitry 225 may be mounted or printed on one board and connected to other elements of connecting circuitry 225 that are mounted or printed on an additional board, and modular devices 215a-f may be mounted on the additional board. Furthermore, connecting circuitry 220 and 225 may be flexible and long enough to permit re-orienting modular devices 215a-f with respect to expansion device connector 205. That is, system 200 may provide alternative configurations for modular devices 215a-f. For example, connecting circuitry 225 may include a ribbon cable and may permit modular devices 215a-f to be oriented as they are shown in FIG. 2 with the ends connecting to connection circuitry 225 to the left, or connecting circuitry 225 may permit modular devices 215a-f to be re-oriented such that the ends connecting to connection circuitry 225 are to the right, indicating that modular devices 215a-f have been rotated 180 degrees with respect to expansion device connector 205.

In an embodiment, connecting circuitry 225 includes a serial connection between each of modular devices 215a-f and controller chip 210. In an embodiment, connecting circuitry connects controller chip 210 and modular devices 215a-f in parallel. In an embodiment, controller chip 210 is a PCIe bridge, modular devices 215a-f are M.2 SSDs, and connecting circuitry 225 connects each of modular devices 215a-f to controller chip 210 according to the PCIe standard. In an embodiment, expansion device 100 (FIG. 1) implements expansion system 200.

The examples of embodiments in this disclosure may generally reference SSDs. However, reference to an SSD module is merely exemplary—it is representative of the numerous devices ("modules" or "modular devices") that may be accommodated by the expansion device. Other devices may be accommodated as well, both instead of an SSD and in addition to an SSD. For example, PCIe modules accommodated by the expansion device may include one or more of: an SSD module, a Wi-Fi® module, a GPS module, a Bluetooth® module, a GSM module, an LTE module, a WiGig module, a WWAN module, a Gigabit Ethernet LAN module, a Dual Gigabit LAN module, a 2G/3G modem module, a FireWire module, a SAS Host Bus Adapter module and a SATA RAID module. Embodiments in this disclosure may generally reference a 3.5" drive bay. However, reference to a 3.5" drive bay is also merely representative of a pre-defined volume, such as the 5.25", 3.5", 2.5", and 1.8" drive bay standards. Also, as used herein "PCIe switch" may represent or refer to: PCIe, a PCIe bridge, a PCIe bridge controller, etc.

Figure 3A:
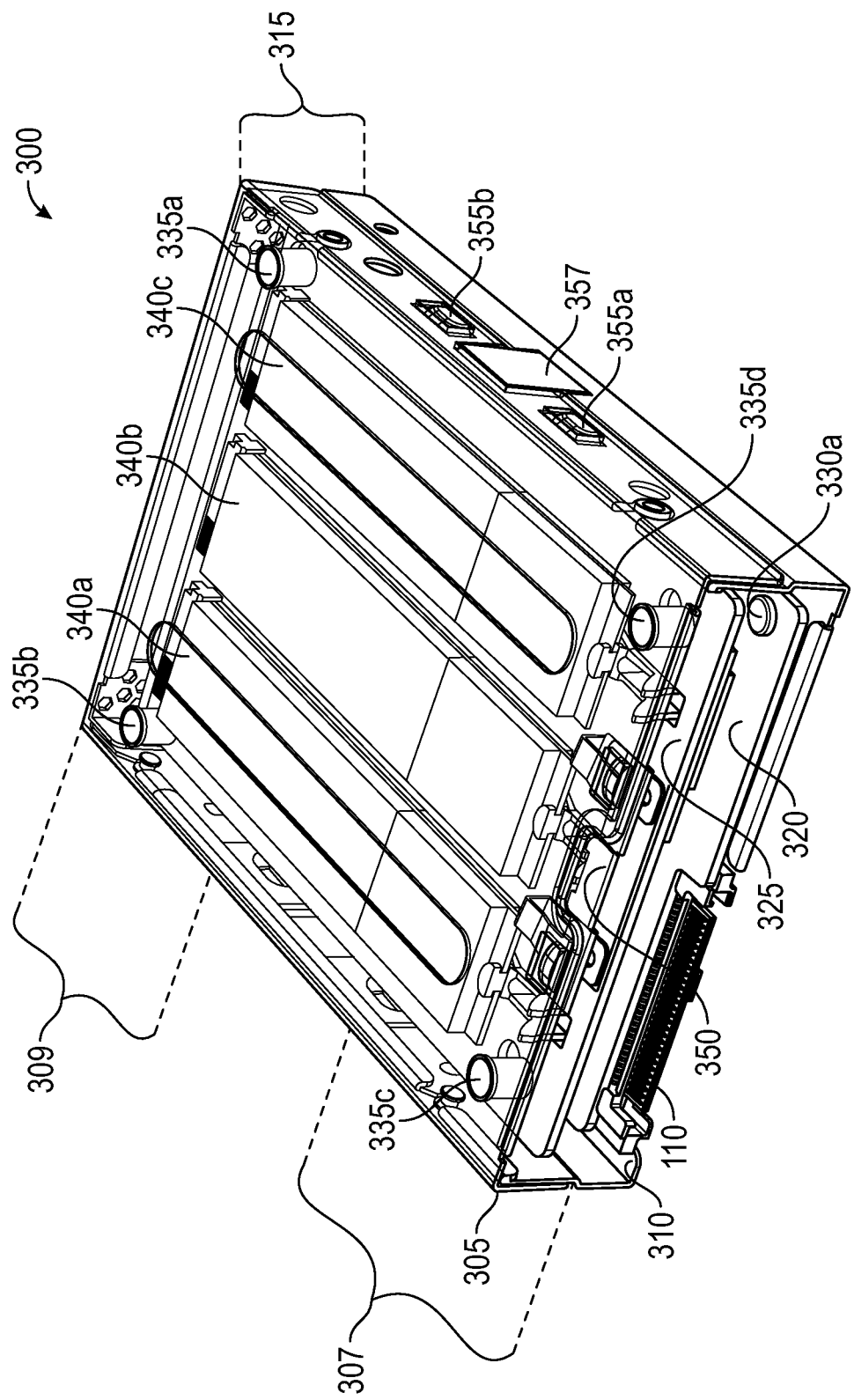
FIG. 3a is a perspective drawing illustrating an embodiment.
Figure 9:
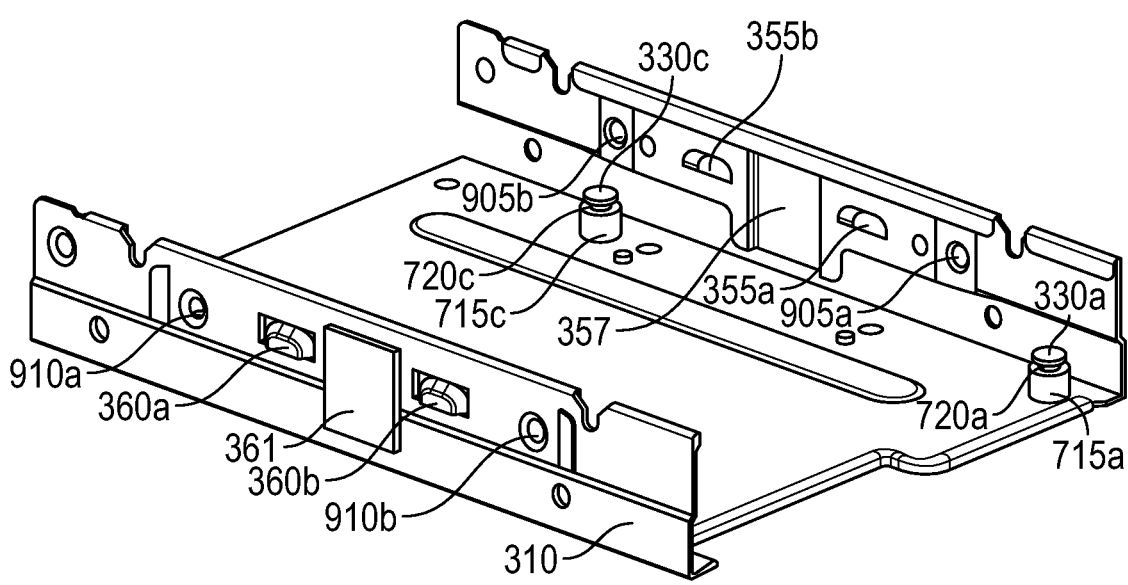
FIG. 9 is a perspective view of a portion illustrating an embodiment.

FIG. 3a is a perspective drawing illustrating an embodiment of an expansion device. In FIG. 3, expansion device 300 is an implementation of expansion system 200. Expansion device 300 includes a housing 315. Housing 315 includes upper housing 305 and lower housing 310. Lower housing 310 includes a spring latch 355 (FIG. 3c), with individual sections including a depress section 357 and engaging sections 355a, 355b. Lower housing includes a support cap 330a, support cap 330b (shown in FIG. 7), and support cap 330c (FIG. 9). Expansion device 300 further includes a lower circuit board 320, an upper circuit board 325. Upper housing 305 is shown partly transparent so that elements within upper housing, such as upper circuit board 325, are visible. Upper housing 305 includes pins 335a-d, which support and retain upper circuit board 325 and separate and position upper circuit board 325 with respect to upper housing 305. Upper circuit board includes modular devices 340a-c, and a spring latch 350. A front section 307 generally indicates a frontal section of expansion device 300 and a rear section 309 generally indicates a rearward section of expansion device 300. Device connector 110 is attached to a front edge of lower circuit board 320.

In an embodiment, controller chip 425 is a PCIe switch, modular devices 340a-c are M.2 SSD modules, and device connector 110 is a SAS-PCI Express (SFF-8639) connector. However, in other embodiments controller chip 425 could be another type of bus controller, and modular devices 340a-c could be other devices, such as other peripheral devices, and could be more or fewer in number.

In FIG. 3a, upper housing 305 and lower housing 310 are for containing the various elements of expansion device 300. Device connector 110 is for connecting expansion device 300 to a central processing unit (CPU) of a computing device, such as a personal computer, server, tablet, or smart phone. In the embodiment, upper housing 305 is shown to receive lower housing 310. Engaging sections 355a, 355b releasably engage upper housing 305 to attach upper housing 305 to lower housing 310.

Figure 3B:
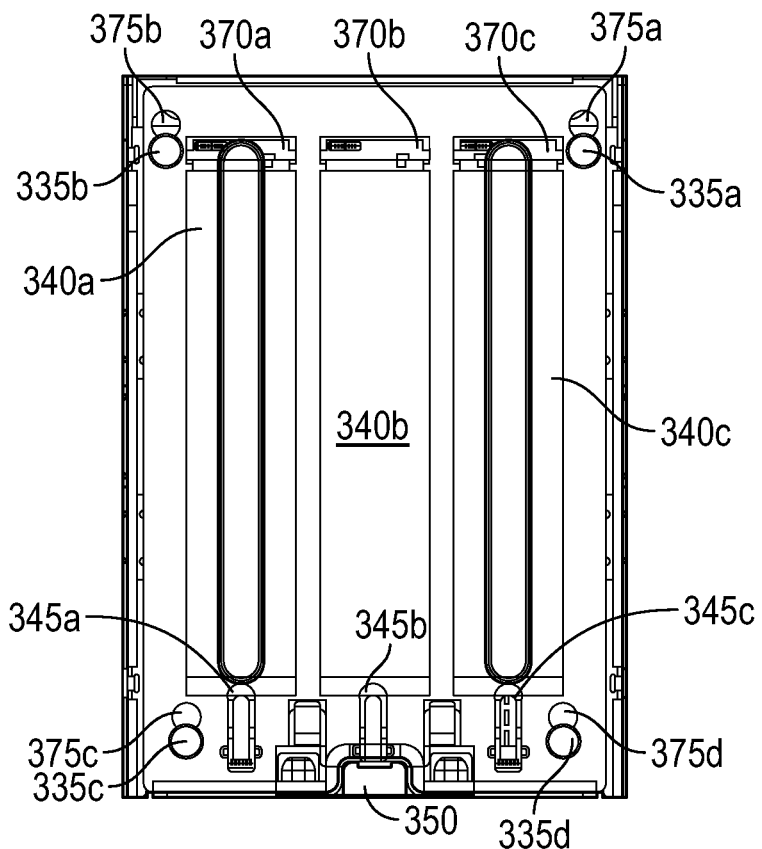
FIG. 3b is a top view illustrating an embodiment.

FIG. 3b is a top view illustrating an embodiment of an expansion device. In FIG. 3b, upper housing 305 is shown partly transparent so that elements of upper circuit board 325 may be viewed. Upper circuit board 325 includes device connectors 370a, 370b, 370c, and device securing structures 345a, 345b, 345c, which retain SSDs 340a-c on upper circuit board 325. Upper circuit board 325 further includes skeleton keyhole-shaped openings 375a, 375b, 375c, 375d which cooperate with pins 335a-d to position and retain upper circuit board 325 within housing 305.

Figure 8A:
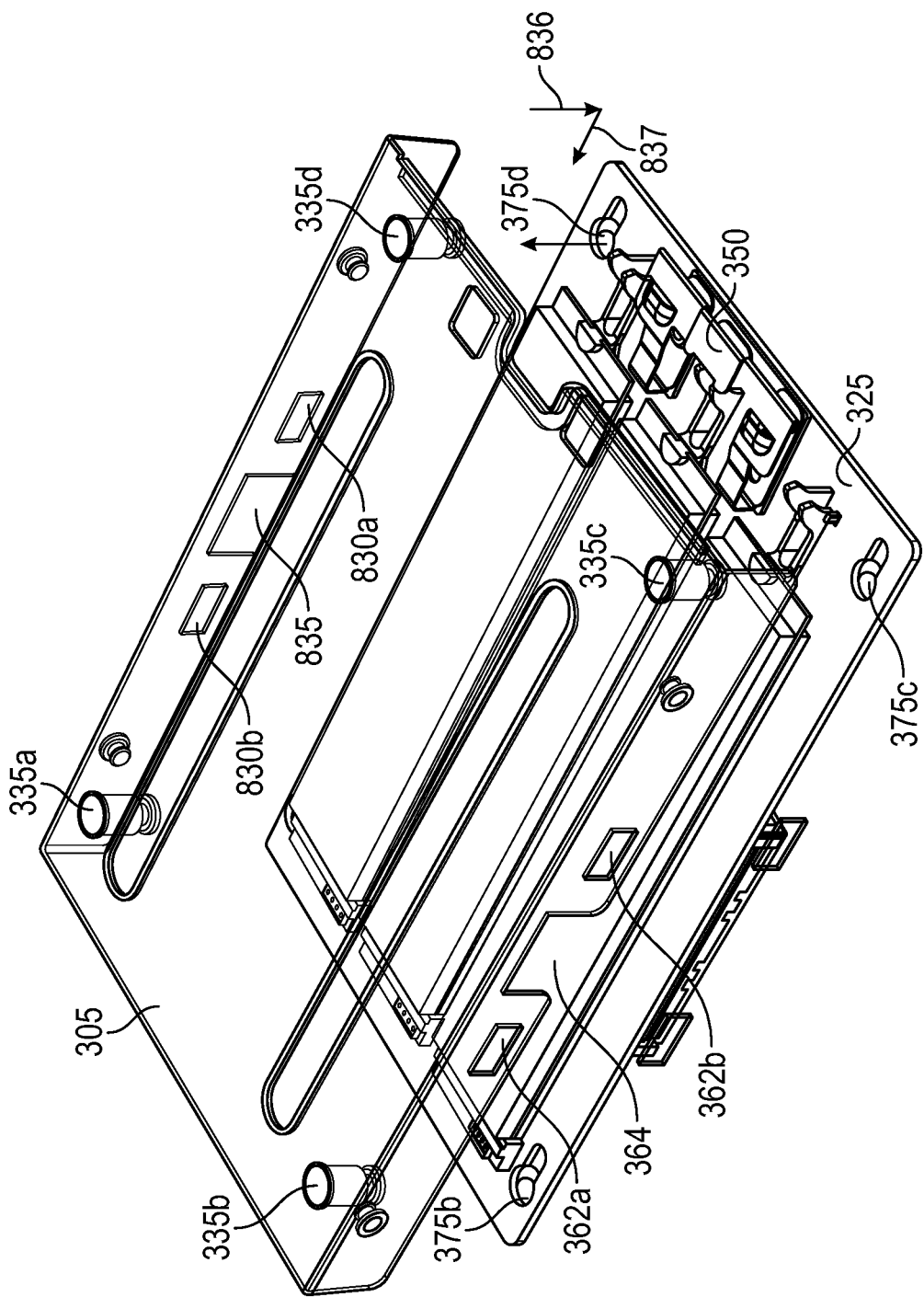
FIGS. 8a-8d are perspective views illustrating an assembly drawing of a portion of an embodiment.

In an embodiment, each of pins 335a-d have a top section with a first diameter, a middle section with a second diameter and a bottom section with a third diameter with the middle section second diameter being smaller than the top section first diameter. Each of openings 375a-d have a circular portion having a diameter and an elongated channel slot portion having a width, with the circular portion diameter being larger than the channel slot width such that the top section and middle section of each pin 335a-d may be inserted through the circular portion (as shown in FIG. 8a) and then the middle section of each cylindrical pin may engage or slide within the channel slot when the circuit board is moved into its final position with respect to upper housing 305 (as shown in FIG. 8c).

Figure 3C:
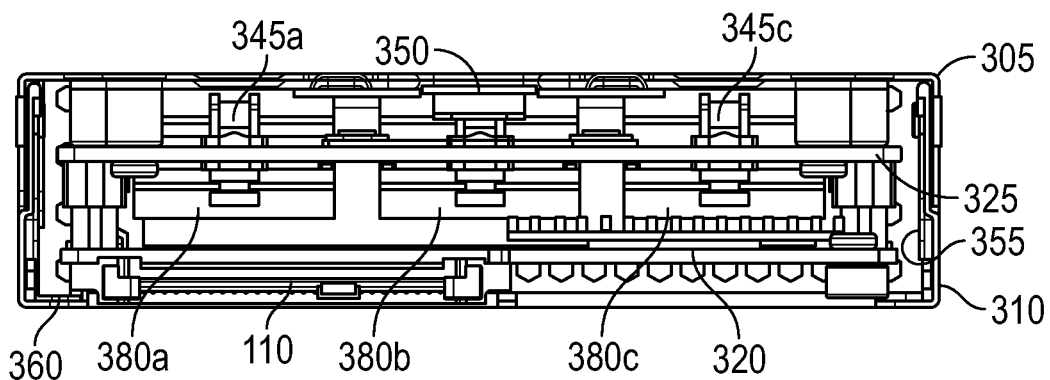
FIG. 3c is a rear view illustrating an embodiment.

FIG. 3c is a front view illustrating an embodiment of an expansion device. In FIG. 3c, lower housing 310 is shown to include spring latch 355. Lower housing further includes a spring latch 360 on the side of lower housing 310 opposing spring latch 355. Spring latches 355, 360 cooperate to maintain an attached state of upper housing 305 to lower housing 310 and maintain a connected state of upper circuit board 325 to lower circuit board 320. Upper circuit board 325 includes SSDs 380a, 380b, 380c mounted on the lower surface of upper circuit board 325.

Figure 3D:
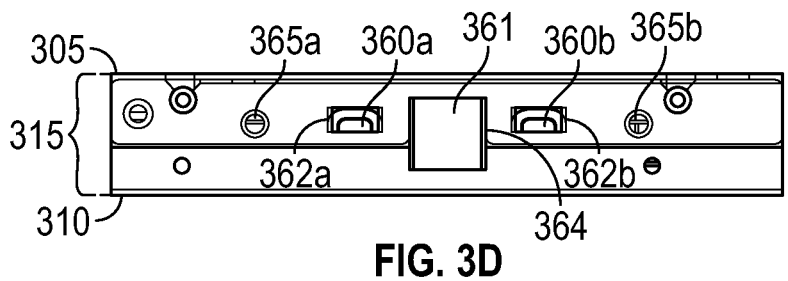
FIG. 3d is a side view illustrating an embodiment.

FIG. 3d is a side view illustrating an embodiment of an expansion device. In FIG. 3d the visible sections of spring latch 360 include a depress section 361 and engaging sections 360a, 360b. Upper housing 305 further includes latch windows 364, 362a, 362b, and spring attachment points 365a, 365b. Urging depress section 361 inward causes engaging sections 360a-b to release latch windows 362a-b. Similarly, urging depress section 357 (FIG. 3a) inward causes engaging sections 355a-b to release latch windows 830a-b (FIG. 8a). More precisely, engaging sections 360a-b and 355a-b disengage from an edge of latch windows 362a-b and 830a-b, respectively.

Thus, as shown in the embodiment of FIGS. 3a-d, expansion device 300 allows the use of up to six full length M.2 SSD modules in the form factor of a 3.5" HDD. Since there are a great many computer and server designs that accept 3.5" HDDs, but which have no space for M.2 devices, expansion device 300 allows those designs to install and use M.2 storage modules.

Figure 4:
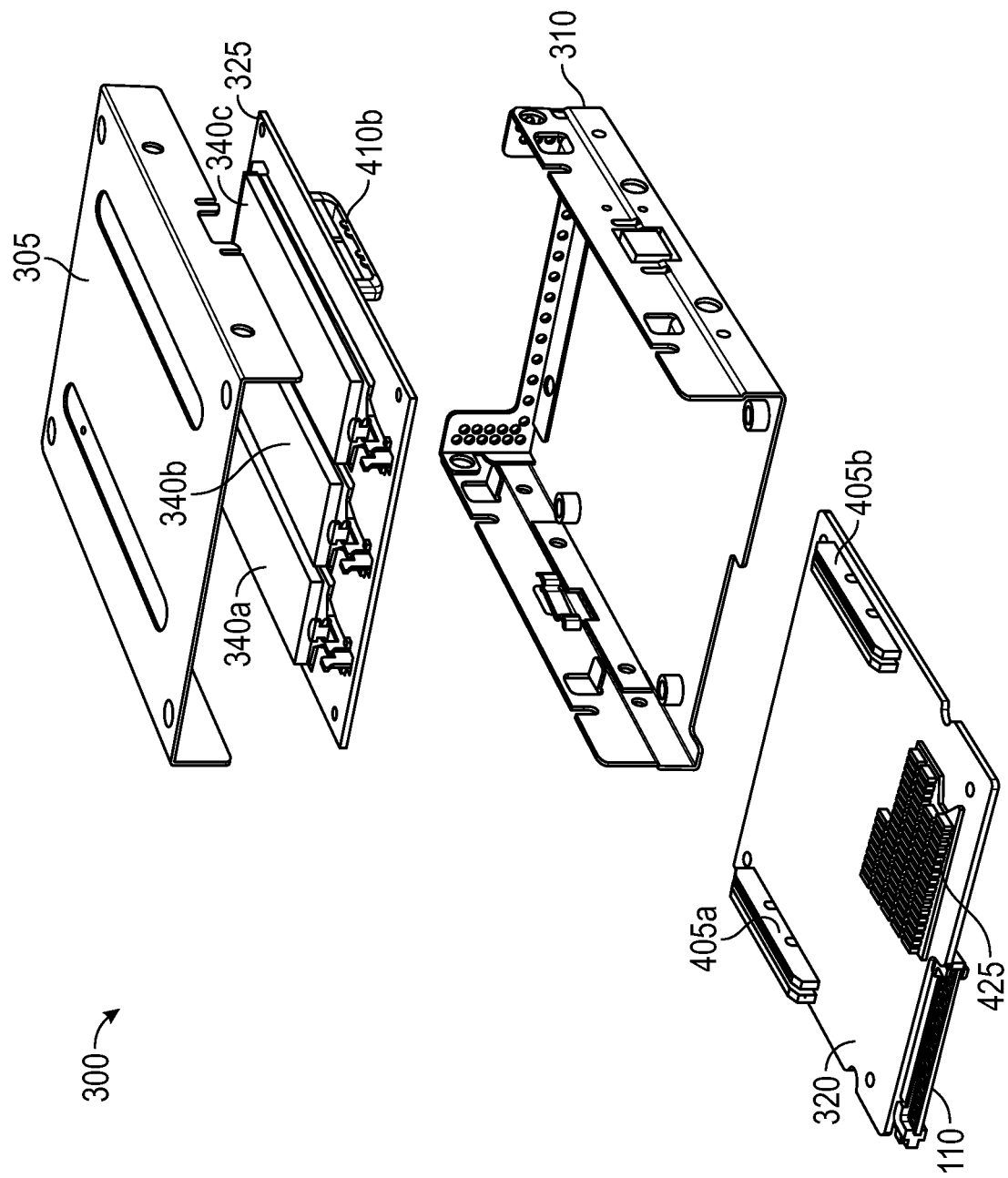
FIG. 4 is an assembly drawing illustrating an embodiment.

FIG. 4 is an assembly drawing illustrating an embodiment. In FIG. 4, Lower circuit board 320 further includes connectors 405a, 405b and controller chip 425. Upper circuit board 325 includes connectors 410a (FIG. 6b), 410b. In the embodiment controller chip is a PCIe switch for connecting the plurality of PCIe modules on upper circuit board to a host computer. Connectors 405a-b mate to connectors 410a-b to connect lower circuit board 320 to upper circuit board 325. Controller chip 425 connects to SSDs 340a-c, 380a-c through the circuitry of lower circuit board 320 and upper circuit board 325. Thus, connecting circuitry 225 (FIG. 2) is embodied by elements of upper and lower circuit boards 320, 325, and connecting circuitry 220 (FIG. 2) is embodied by elements of lower circuit board 320. One of skill will understand that the connections created using connector pairs 405a/410a and 405b/410b could be created using one pair of connectors or more than two pairs of connectors.

FIG. 5a is a bottom view of lower circuit board 320. FIG. 5b is a top view of lower circuit board 320. In FIGS. 5a-b, lower circuit board 320 is shown to include skeleton keyhole-shaped openings 505a, 505b, 505c, and a hole 510. Openings 505a-c each include a narrow slot 515a, 515b, 515c. Openings 505a-c and slots 515a-c are for engaging pins 715a-c (FIGS. 7 and 9) to position and secure lower circuit board 320 within lower housing 310. The function of openings 505a-c and slots 515a-c will be discussed further with respect to FIG. 7.

Figure 6B:
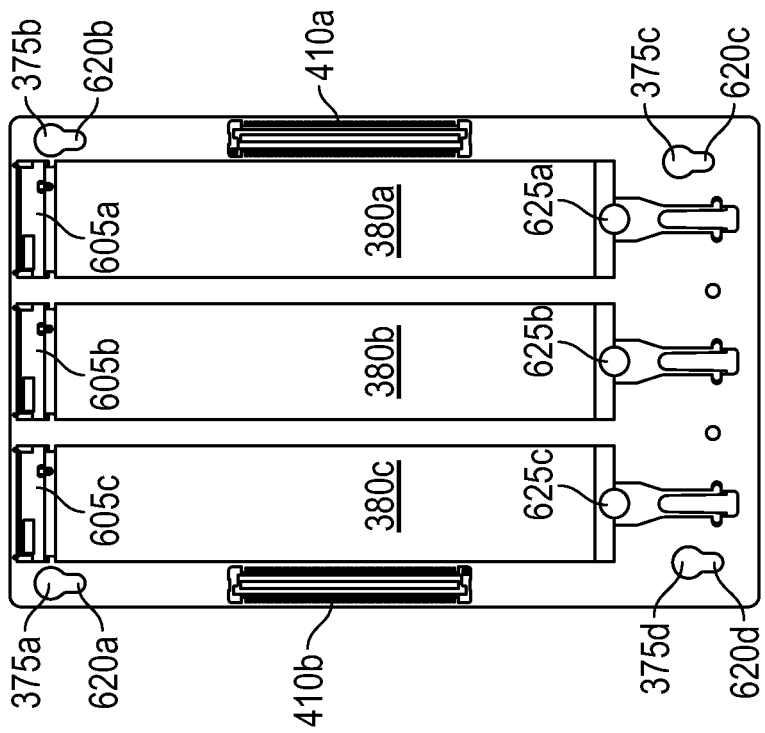
FIG. 6b is a bottom view illustrating a circuit board of an embodiment.
Figure 6A:
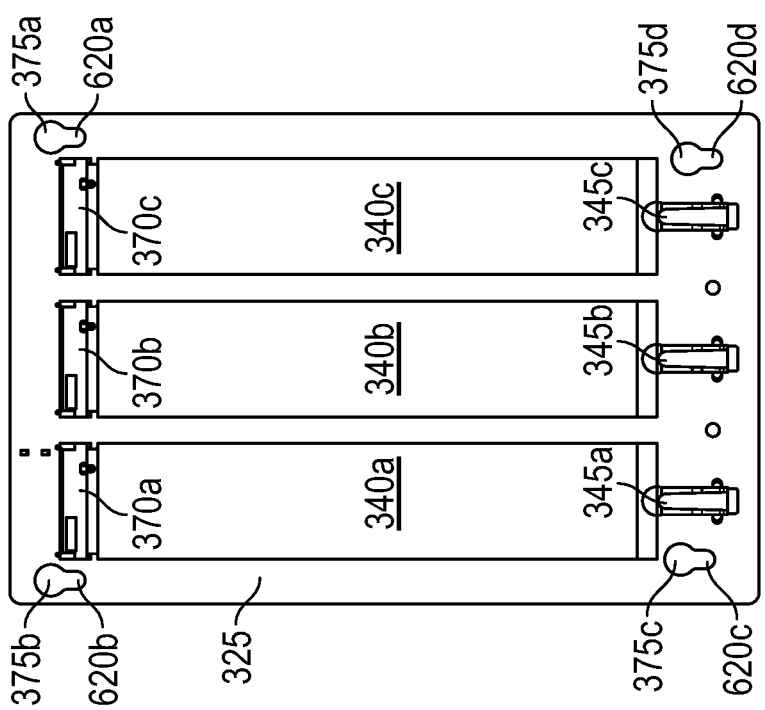
FIG. 6a is a top view illustrating a circuit board of an embodiment.

FIG. 6a is a top view of upper circuit board 325. FIG. 6b is a bottom view of upper circuit board 325. In FIGS. 6a-b, upper circuit board 325 is shown to include skeleton keyhole-shaped openings 375a, 375b, 375c, 375d. Openings 375a-d each include a narrow slot 620a, 620b, 620c, 620d. In FIG. 6b, upper circuit board 325 includes device connectors 605a, 605b, 605c, and device securing structures 625a, 625b, 625c. Device connectors 605a-c and device securing device securing structures 625a-c cooperate to retain SSDs 380a-c on upper circuit board 325. Openings 375a-d and slots 620a-d engage pins 335a-d (FIG. 3a, 3b) to position and secure upper circuit board 325 within upper housing 305. Connectors 410a-b mate to corresponding connectors 405a-b to connect SSDs 340a-c and 380a-c to controller chip 425.

Figure 7:
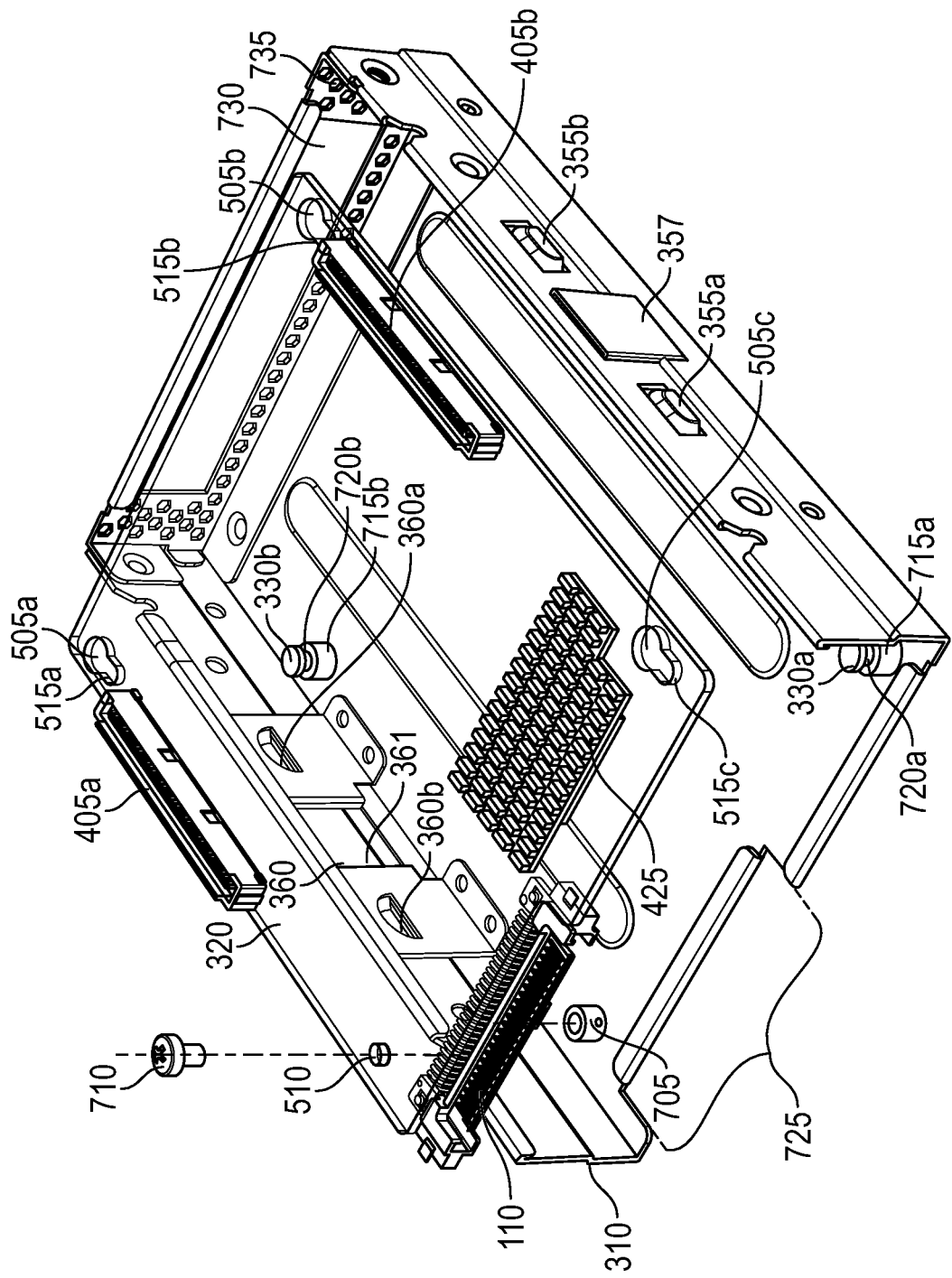
FIG. 7 is a perspective view illustrating an assembly drawing of a portion of an embodiment.

FIG. 7 is a perspective view illustrating an assembly drawing of a portion of an embodiment. In FIG. 7, lower circuit board 320 is shown partially transparent so that elements of lower housing 310 may be viewed. Pins 715a, 715b, 715c (715c is shown on FIG. 9) include support top sections 330a, 330b, 330c (330c is shown on FIG. 9), respectively. Support top sections 330a-c are connected to pins 715a-c by narrow sections that create slots 720a, 720b, 720c (720c is shown on FIG. 9) between each of support top sections 330a-c and pins 715a-c, respectively. Lower housing 310 includes a threaded boss 705 for receiving a bolt 710 through hole 510. Lower housing 310 further includes a window 725 for providing access to device connector 110, and opening 730 (large and rectangular) and openings 735 (small and round) for allowing air to flow through the rear section of lower housing 310. Alternatively, the securing function of bolt 710 could be performed by a threaded rod within boss 705 and a wing-nut for securing lower board 320 against boss 705. A benefit of a wing-nut would be that it would not require the use of a tool to remove or replace and would facilitate the tool-less removal of lower board 325.

In an embodiment, each of pins 715a-c have top sections 330a-c with a first diameter, a middle section 720a-c with a second diameter and a bottom section with a third diameter with the middle section second diameter being smaller than the top section first diameter. Each of openings 505a-c have circular portions having a diameter and elongated channel slot portions 515a-c having a width, with the circular portion diameter being larger than the channel slot width such that top section 330a-c and middle sections 720a-c of each pin 715a-c may be inserted through the circular portion and then the middle section of each cylindrical pin may engage or slide within one of channel slots 515a-c when circuit board 320 is moved into its final position with respect to lower housing 310.

To assemble lower circuit board 320 to lower housing 310, top sections 330a-c are inserted through openings 505a-c until lower circuit board 320 aligns with slots 720a-c. Lower circuit board 320 is then urged toward the rear of housing 310, which causes lower circuit board 320 to be retained by slots 720a-c. Bolt 710 is then fastened to boss 705 through hole 510, which maintains the position of lower circuit board 320 by preventing lower circuit board 320 from moving forward and disengaging from slots 720a-c. If, instead of bolt 710, a threaded rod and wing nut are used to secure lower circuit board 320 against boss 705 (or another tool-less fastener is used), then lower circuit board 320 may be removed and installed without the use of a tool.

FIGS. 8a-8d are perspective views illustrating the tool-less assembly of upper circuit board 325 to upper housing 305. In FIGS. 8a-d, upper housing 305 is shown partially transparent to allow viewing the elements within. In FIG. 8a, upper housing 305 includes latch windows 835, 830a, and 830b. An arrow 836 indicates the movement of upper housing 305 relative to upper circuit board 325 during assembly. An arrow 837 indicates the movement of upper circuit board 325 relative to upper housing 305 during assembly.

In an embodiment, the supporting and retaining functions performed by pins 715a-c and slots 720a-c, and by pins 335a-d and slots 620a-d in pins 335a-d are performed by slots formed into side walls of upper housing 305. To assemble, the rear sections of the sides of upper circuit board 325 is positioned within such slots. Upper circuit board 325 is then slid in direction 837 toward the read of upper housing 305.

Figure 8B:
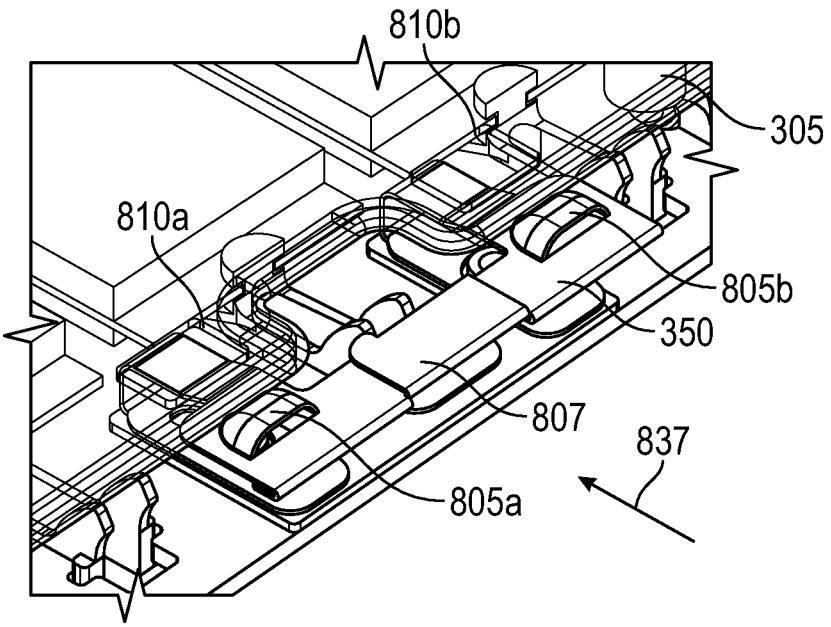
Figure 8C:
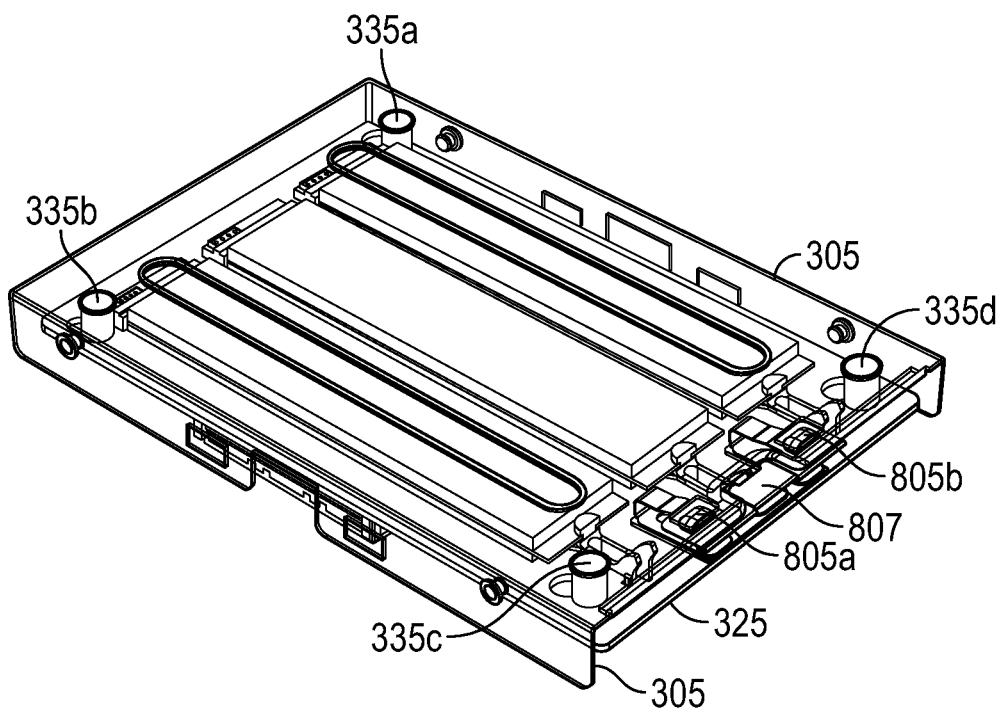

In FIG. 8b, latch spring 350 on upper circuit board 325 includes a depress section 807 and engaging sections 805a, 805b. Upper housing 305 includes latch windows 810a, 810b and is cut away to provide access to depress section 807. Engaging sections 805a-b engage windows 810a-b to retain upper circuit board within upper housing 305. Openings 375a-d and slots 620a-d (FIG. 6) are for engaging pins 335a-d (FIG. 3a, 3b) to position and secure upper circuit board 325 within upper housing 305 and latch spring 350 is for maintaining the position of upper circuit board 325 in the retained position.

Figure 8D:
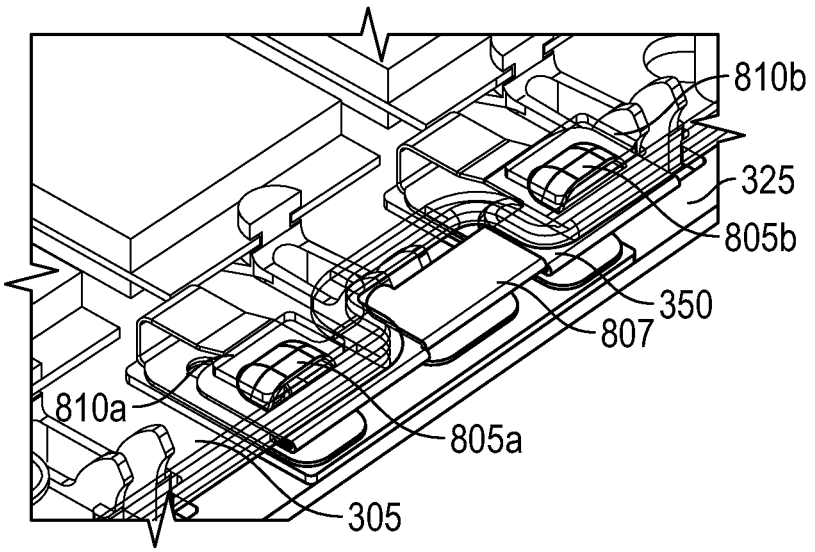

The procedure for assembling upper circuit board 325 to upper housing 305 does not require a tool and is very similar to that for assembling lower circuit board 320 to lower housing 310. Pins 335a-d are shaped like pins 715a-c. As indicated in FIG. 8a, top sections on pins 335a-d are inserted in direction 836 through openings 375a-d until upper circuit board 325 aligns with slots in openings 375a-d. Upper circuit board 325 is then urged in direction 837 toward the rear of housing 305, which causes upper circuit board 325 to be retained by slots in pins 335a-d. In FIG. 8b, upper circuit board 325 is inserted in direction 837 until engaging section 805a-b engage windows 810a-b, as shown in FIG. 8d. At this point upper circuit board 325 has been fixed within upper housing 305 without the use of a tool, as shown in FIG. 8c.

Figure 8E:
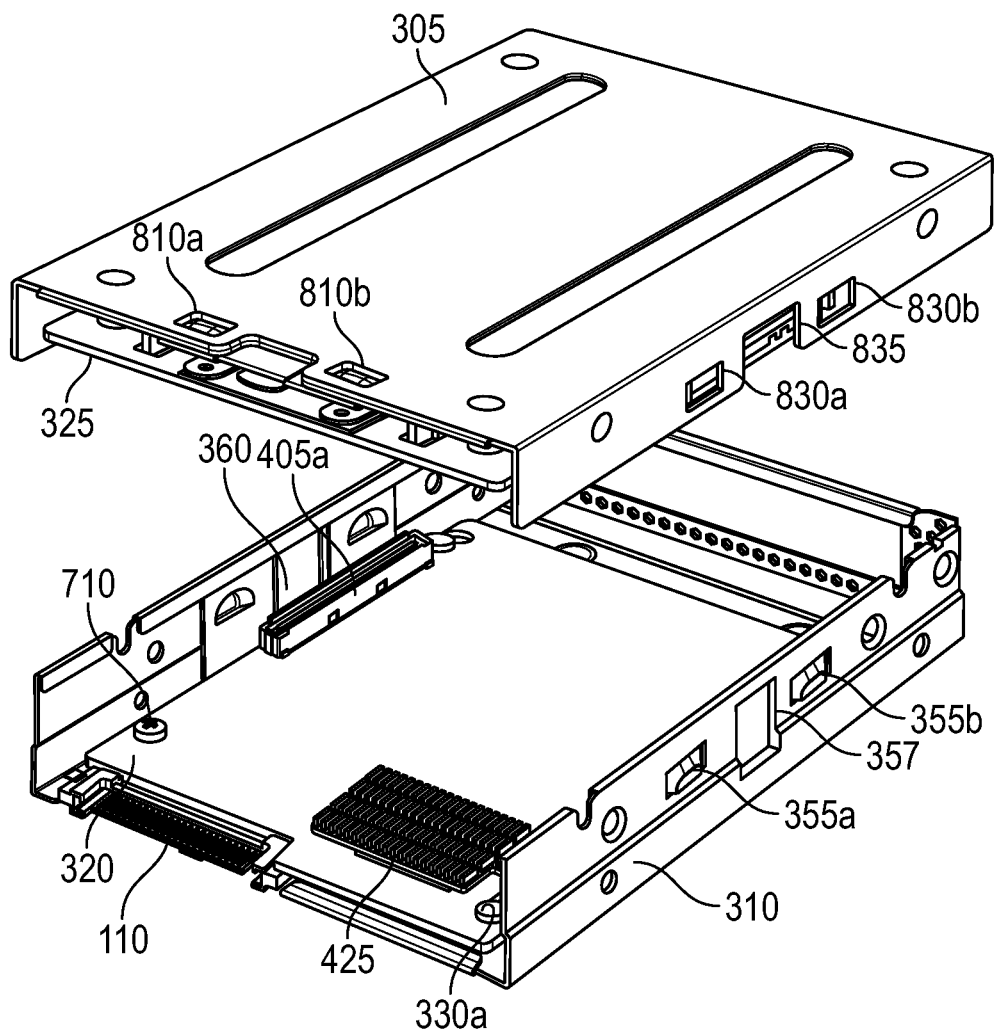
FIG. 8e is a perspective view of an assembly drawing illustrating an embodiment.

FIG. 8e illustrates the assembly of upper housing 305 and upper circuit board 325 to lower housing 310 and lower circuit board 320 to create an expansion device 300. In FIG. 8e, to assemble upper housing 305 to lower housing 310, upper housing 305 is positioned over lower housing 310 and the side of upper housing 305 are lowered over the corresponding sides of lower housing 305 until engage sections 355a-b and 360a-b (not shown) engage the corresponding windows 830a-b and 362a-b (not shown). This movement simultaneously causes connectors 410a-b on upper circuit board 325 to connect to connectors 405a-b on lower circuit board 320.

Figure 8F:
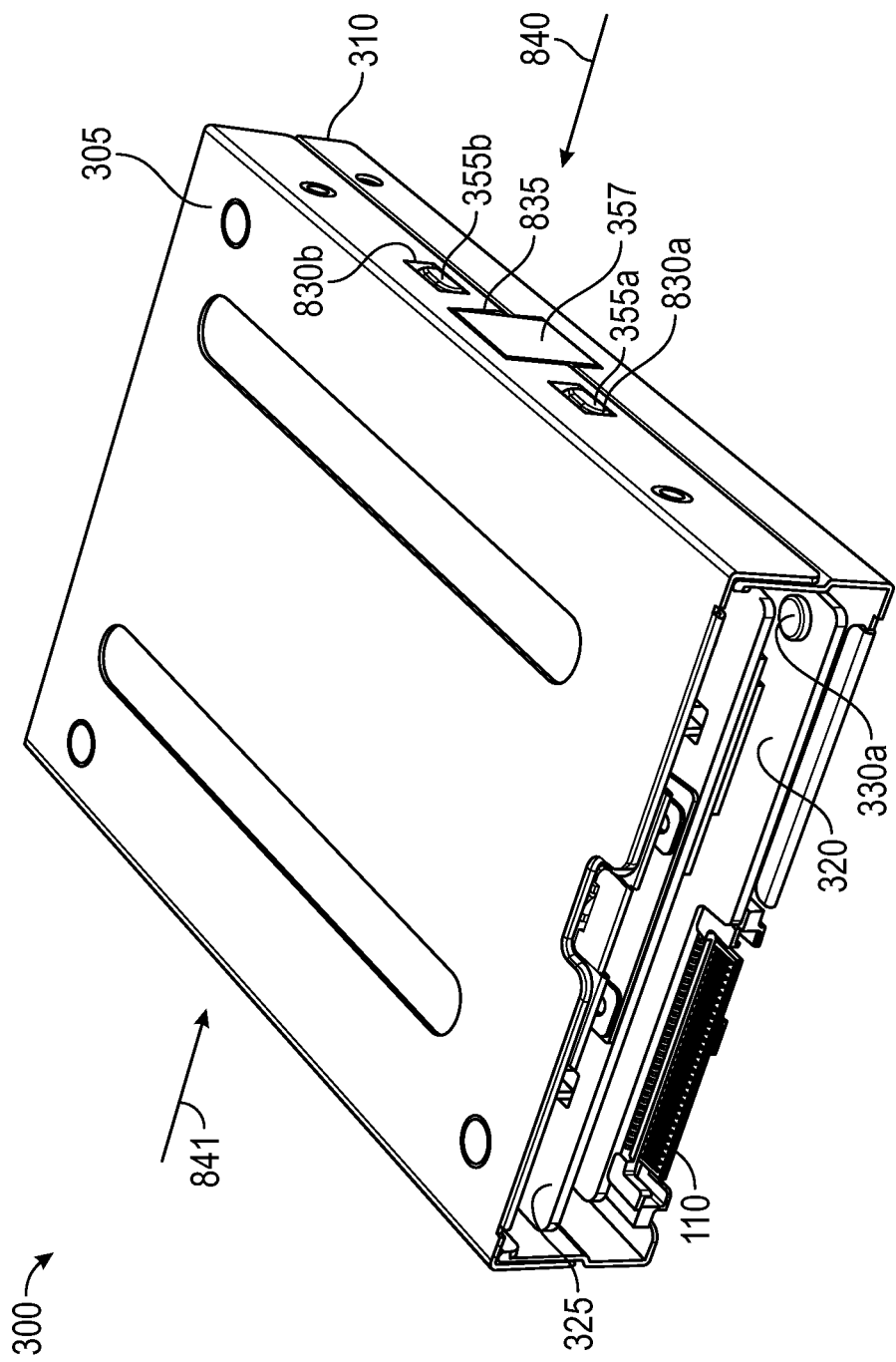
FIG. 8f is a perspective view illustrating an embodiment.

FIG. 8f is a perspective view illustrating an embodiment. FIG. 8f depicts an assembled expansion device 300. In FIG. 8f, an arrow 840 indicates the direction that depress section 357 is urged in order to cause engage sections 355a, 355b to disengage from upper housing 305 at windows 830a, 830b, respectively. Arrow 841 indicates the direction that depress section 361 (FIG. 3d) is urged in order to cause engage sections 360a, 360b (FIG. 3d) to disengage from upper housing 305 at windows 362a, 362b (FIG. 3d), respectively. Upon depressing depress section 357, 361 sufficiently to disengage engage sections 355a, 355b, 360a, 360b, upper housing 310 and upper circuit board 325 may be separated from lower housing 305 and lower circuit board 320, as shown in FIG. 8e. The procedure for removing upper circuit board 325 from upper housing 305 is the reverse of the assembly procedure described with respect to FIGS. 8a-8d.

In embodiments, no tool is required to install or remove the upper circuit board 325 from the expansion device 300. It should be further noted that embodiments of securing structures 345a-c and 625a-c do not require the use of a tool to remove and install an individual SSD. Thus, embodiments provide for the tool-less removal and installation of individual devices from expansion device 300.

FIG. 9 is a perspective view illustrating lower housing 310, latch spring 355, latch spring 360, and pins 715a, 715c. Latch spring 355 further includes connection holes 905a, 905b which may be used to connect latch spring 355 to lower housing 310. Lower housing 310 further includes connection holes 910a, 910 which may be used to connect latch spring 355 to lower housing 310. The connections using connection holes 905a, 905b, 910a, 910b may be completed per the methods known to one of skill, for example, by using bolts, rivets, press-fits, or deforming material from latch springs 355, 360 into and through corresponding connection holes in lower housing 310. Depressing depress regions 357, 361 sufficiently causes engage sections 355a-b and 360a-b to disengage from respective windows in upper housing 830a-b (FIGS. 8a) and 362a-b (FIG. 3).

Figure 10A:
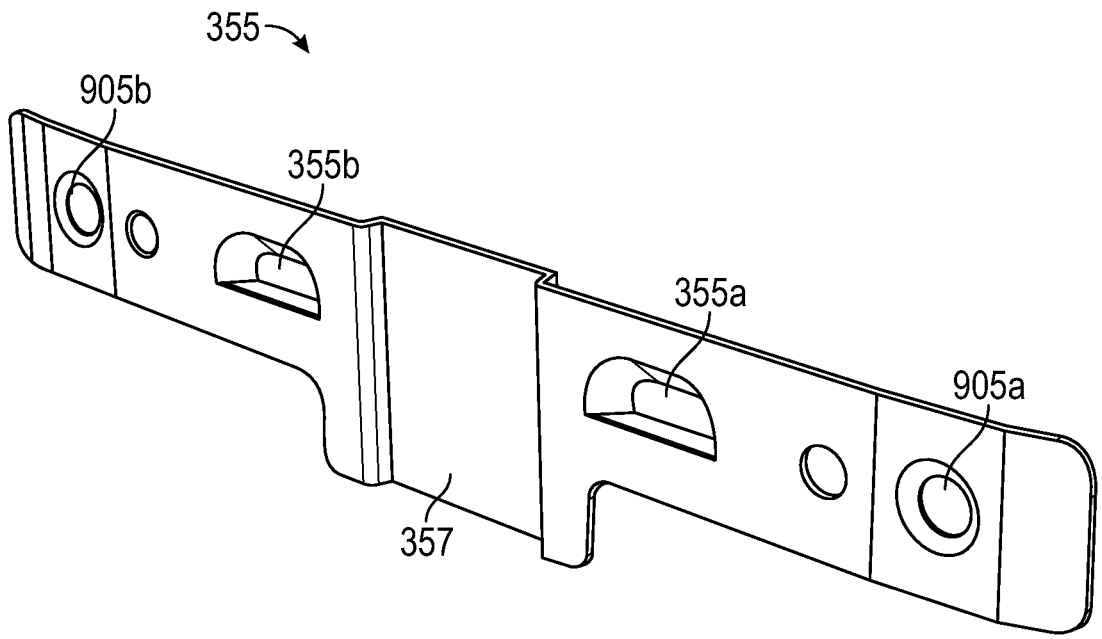
FIGS. 10a and 10b are perspective views illustrating an element of an embodiment.
Figure 10B:
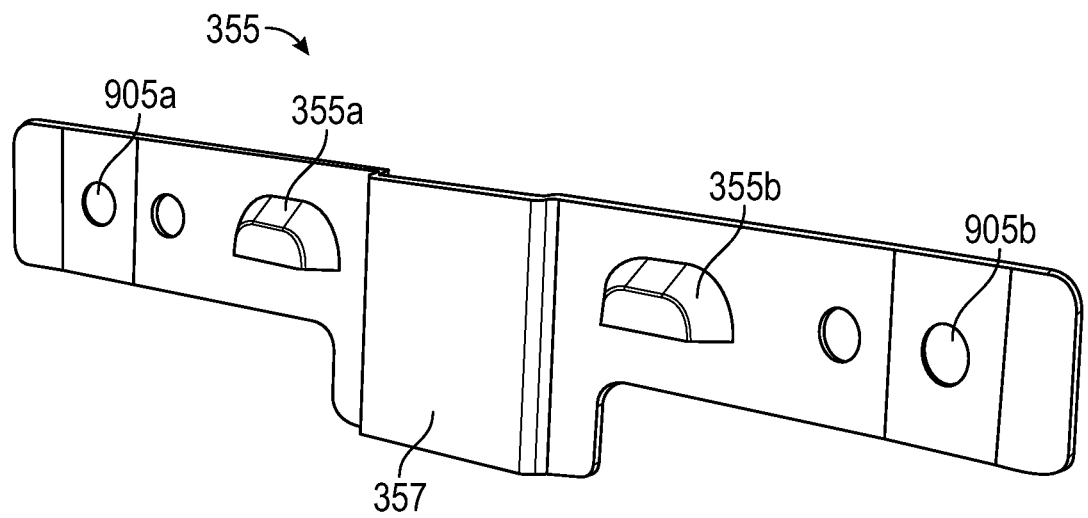

FIGS. 10a and 10b are perspective views illustrating an element of an embodiment. FIGS. 10a and 10b depict latch spring 355. Latch spring 355 is attached to lower housing 305 at connection holes 905a-b. Lower housing 310 further includes connection holes that are used to connect latch spring 355 to lower housing 310. Bends in the material at the sides of depress section 357 and the elasticity of the material itself facilitate the movement of engage sections 355a-b when depress section 357 is depressed. In an embodiment, engage sections 355a-b engage windows 830a-b (FIG. 8e) at least approximately 1 mm.

Figure 11A:
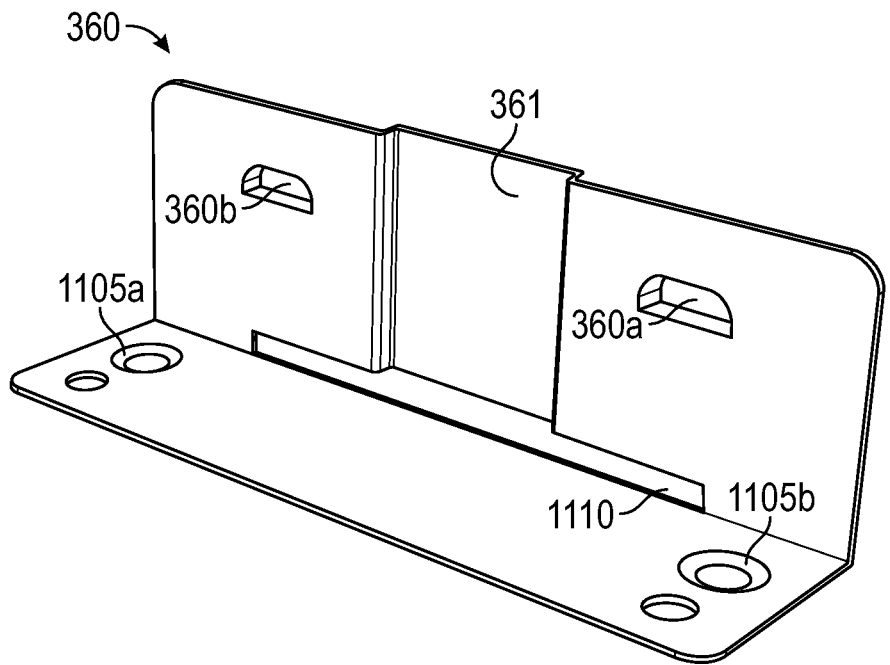
FIGS. 11a and 11b are perspective views illustrating an element of an embodiment.
Figure 11B:
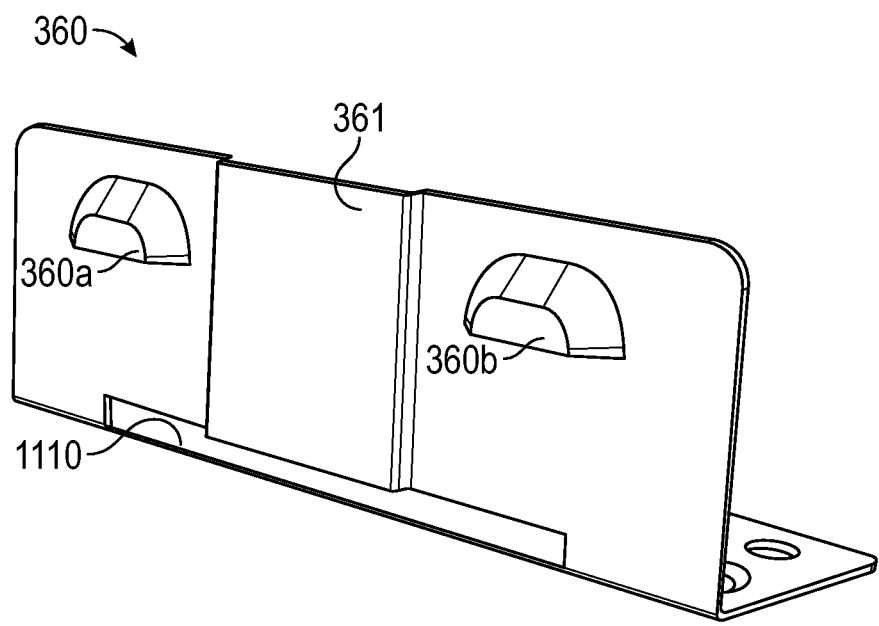

FIGS. 11a and 11b are perspective views illustrating an element of an embodiment. FIGS. 11a and 11b depict latch spring 360. Latch spring 360 includes a slot 1110. Latch spring 360 includes connection holes 1105a, 1105b, which are used to connect latch spring 360 to lower housing 310. Lower housing 310 further includes connection holes, which are used to connect latch spring 360 to lower housing 310 as described with respect to latch spring 355 and FIG. 9. Bends in the material at the sides of depress section 361, slot 1110, and the elasticity of the material itself cooperate to facilitate the movement of engage sections 360a-b when depress section 361 is depressed. In an embodiment, engage sections 360a-b engage windows 362a-b (FIG. 3d) at least approximately 1 mm.

Figure 12A:
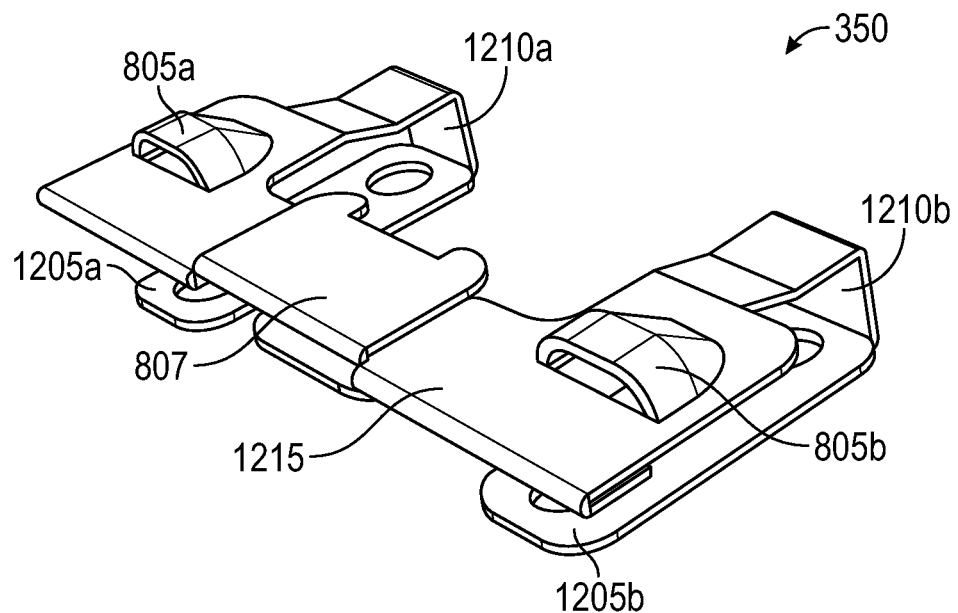
FIGS. 12a and 12b are perspective views illustrating an element of an embodiment.
Figure 12B:
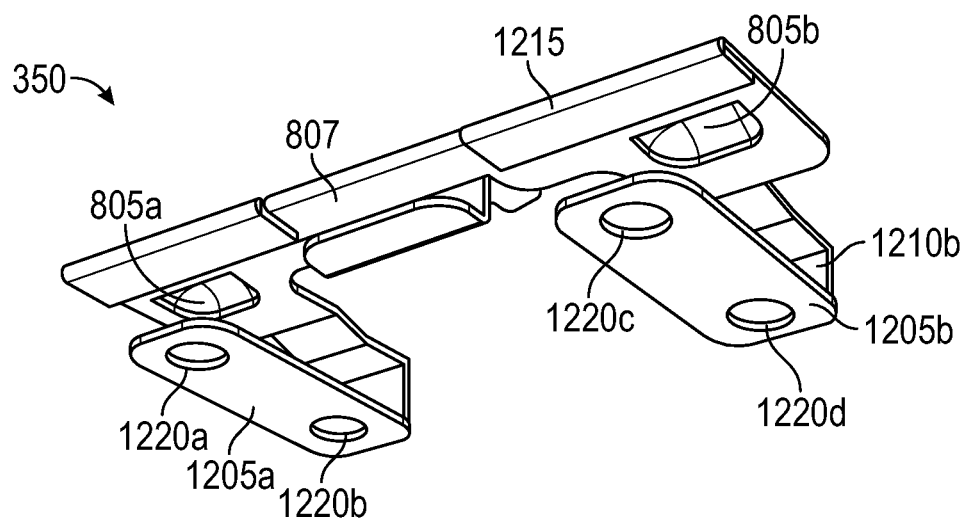

FIGS. 12a and 12b are perspective views illustrating latch spring 350. In FIG. 12a, latch spring 350 includes foot 1205a, and foot 1205b, arm 1210a and arm 1210b, and cross-member 1215. Latch spring 350 includes connection holes 1220a, 1220b, 1220c, 1220d, which are used to connect latch spring 350 to upper circuit board 325. Upper circuit board 325 further includes connection holes (not shown), which are used to connect latch spring 350 to upper circuit board 325 as described with respect to latch spring 355 and FIG. 9. Bends in the material of arms 1210a-b and the elasticity of the material itself cooperate to facilitate the movement of engage sections 805a-b when depress section 807 is depressed. In an embodiment, engage sections 805a-b engage windows 810a-b (FIG. 8b) at least approximately 1.71 mm.

Alternative Configurations

In certain systems, the orientation of the drive bay with respect to other elements of a host system may be fixed. However, the fixed orientation may result in an environment that is not optimal for the performance of a device contained in the expansion device. For example, the forced air flow through a drive bay may be in a first direction, while, for optimal heat dissipation, the air flow should be in the reverse direction. That is, an expansion device may be placed in various locations in a main server system, and different locations may have cooling airflow that passes the expansion device from different directions. Similarly, the antenna placement on a GPS module may be improved in one of two alternative configurations due to it being moved relative to other system components, or due to it being oriented differently, or both. It may be unreasonable or impracticable to redesign the forced air flow to accommodate an expansion device, and making multiple configurations of an expansion device would add cost and complicate inventory. An embodiment provides the ability to rotate upper circuit board 325 with respect to the rest of expansion device 300 and thereby provide two alternative configurations for the modular devices 340a-c and 380a-c, one of which may be more preferable for SSDs 340a-c and 380a-c depending on the system in which expansion housing 300 is placed. The embodiment packages SSDs 340a-c and 380a-c on upper circuit board 325 with one or more connectors between the upper and lower circuit board 320. The one or more connections between the upper and lower circuit boards are located to allow the upper circuit board 325 to be assembled in at least two alternate configurations with respect to lower circuit board 320. Thus, the modular devices on upper circuit board 325 may be more optimally located or oriented.

Figure 13A:
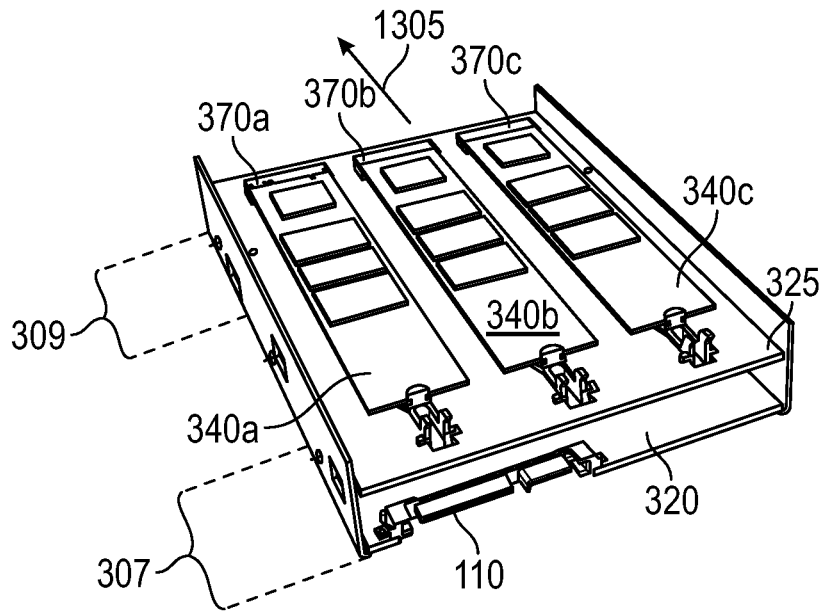
FIGS. 13a and 13b are perspective views illustrating alternative configurations of a portion of an embodiment.
Figure 13B:
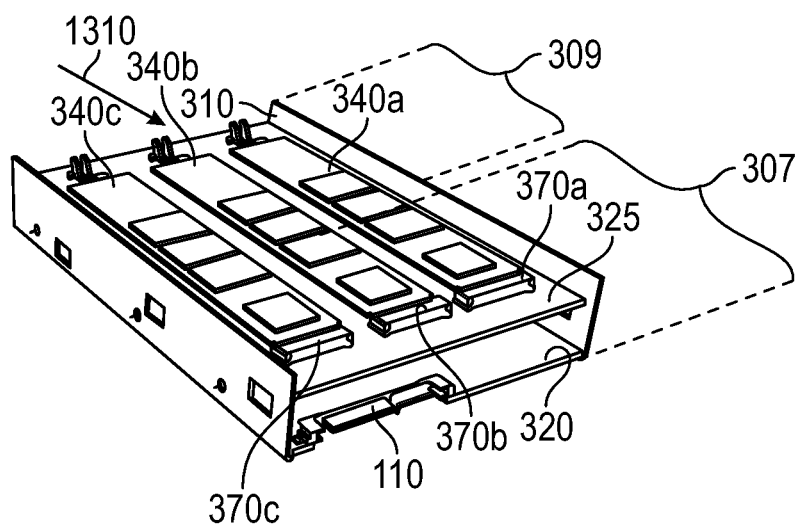

FIGS. 13a and 13b are perspective views illustrating alternative configurations of a portion of an embodiment. In FIG. 13a, 13b, upper housing 310 is not shown to more clearly show other elements. FIG. 13a depicts a first alternative configuration of expansion device 300 and FIG. 13b depicts a second alternative configuration. In FIG. 13a, an arrow 1305 depicts a direction of airflow, and upper circuit board 325 is shown in an orientation in which device connectors 370a-c are oriented toward rear section 309. For the purposes of this example, it is assumed that the direction 1305 of airflow across SSDs 340a-c is preferred over airflow in the opposite direction. That is, for this example, SSDs 340a-c dissipate heat better if the flow of cooling air is across the body of the SSD toward the connector end of the SSD. Thus, should expansion device 300 be placed in an environment where the direction of airflow is contrary to direction 1305, it would be beneficial to be able to re-orient upper circuit board 325 so that the airflow over SSDs 340a-c is in the preferred direction. In FIG. 13b, an arrow 1310 depicts an airflow that is in the opposite direction from that of arrow 1305. To place SSDs 340a-c in the preferred orientation with respect to airflow 1310, upper circuit board 325 has been rotated 180 degrees about an axis orthogonal to the plane of upper circuit board 325. In FIGS. 13a, 13b, lower circuit board 320 is not rotated relative to housing 310, as indicated by device connector 110 remaining in the same location in both FIGS. 13a, 13b. In both FIGS. 13a and 13b, upper circuit board 325 is connected to lower circuit board 320 using connectors 405a, 405b (See FIGS. 14a, 14b).

Figure 14B:
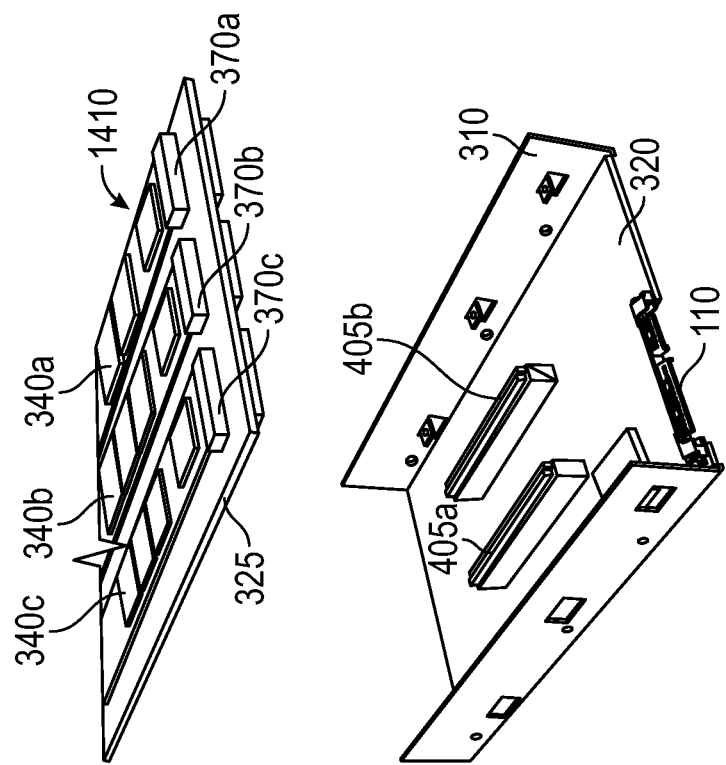
FIGS. 14a and 14b are perspective views illustrating an assembly drawing showing alternative configurations of a portion of an embodiment.
Figure 14A:
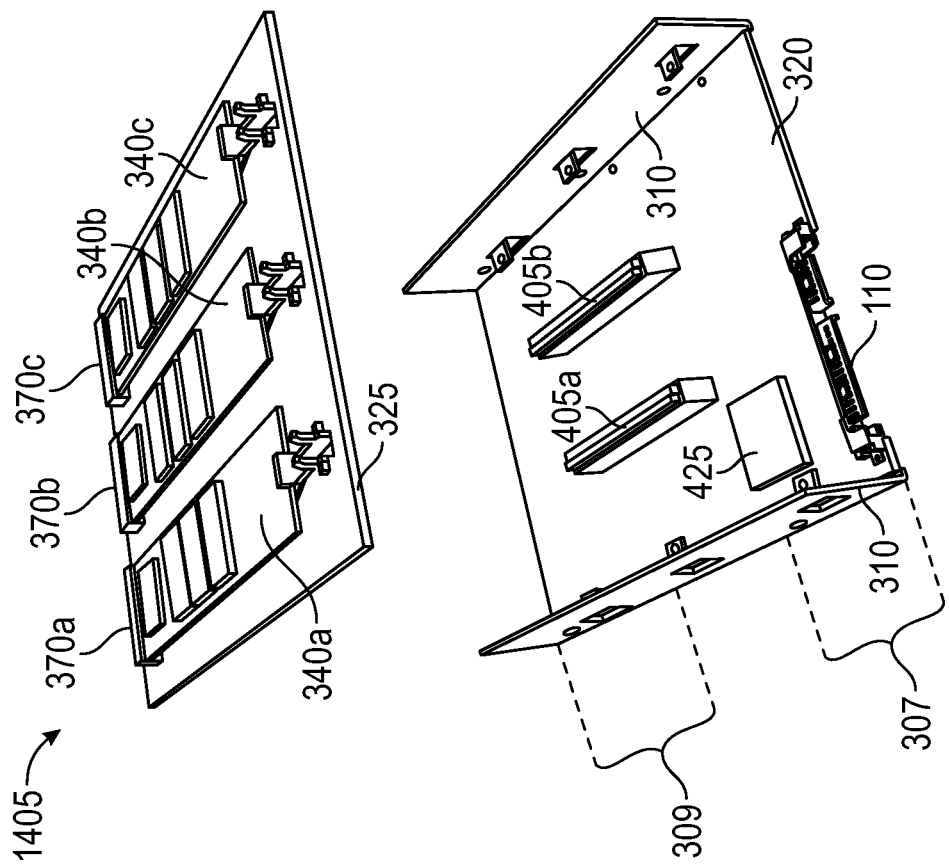

Continuing with the example, FIGS. 14a and 14b depict further the rotation of upper circuit board 325 with respect to lower housing 310 to preferentially orient SSDs 340a-c. In FIG. 14a, orientation 1405 is the orientation that is preferred given airflow 1305 and in FIG. 14b, orientation 1410 is the orientation that is preferred given airflow 1310. Upper circuit board 325 is shown separated from lower circuit board 320 to show an arrangement of connectors 405a, 405b that facilitates the rotation and reconnection of upper circuit board 325—connectors 405a, 405b have been oriented to be symmetrical about the axis of rotation of upper circuit board 325.

Figure 15:
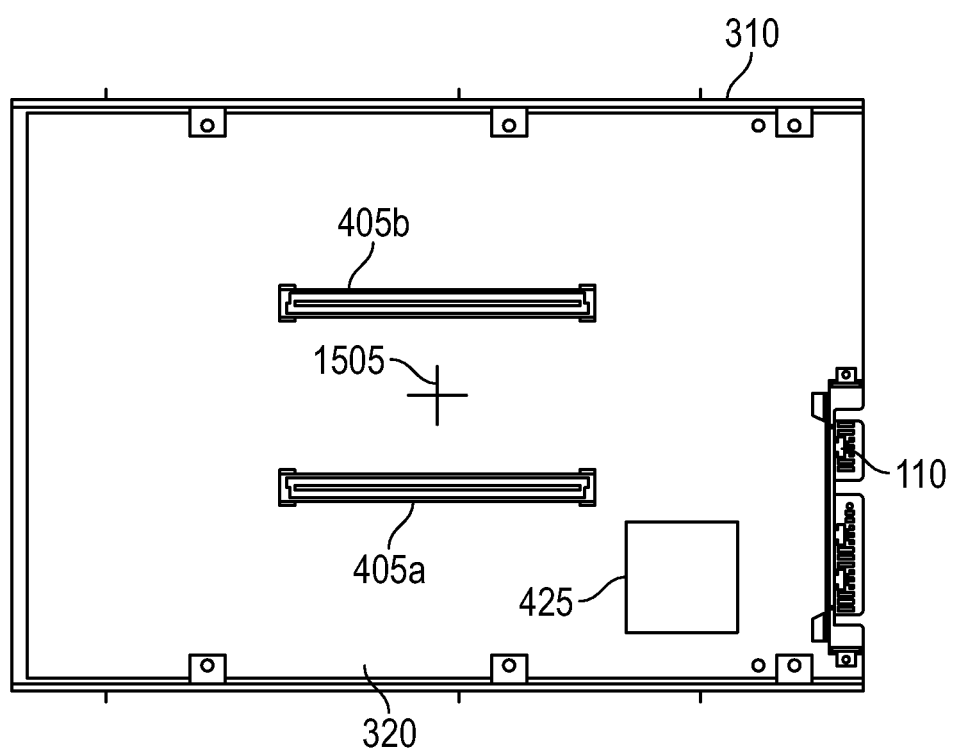
FIG. 15 is a top view illustrating a circuit board of an embodiment.

Still continuing with the example, FIG. 15 is a top view illustrating a circuit board of an embodiment. In FIG. 15, an axis 1505 is oriented orthogonally to the plane of lower circuit board 320. A similar axis (not shown) exists for upper circuit board 325. Connectors 405a, 405b are positioned equidistant from axis 1505. Connector 405b is also rotated 180 degrees from the orientation of connector 405a. Also, the connector pinouts for connectors 405a, 405b are the same. That is, as the connectors are shown in this figure, if connector 405a has a connector pinout numbering from 1 to N as read from left to right, then connector 405b has a connector pinout numbering from 1 to N as read from right to left. Though not shown, the corresponding connectors 410a, 410b on upper circuit board 325 are similarly positioned and rotated about the similar axis with the pinout maintained so that they functionally connect in either alternative configuration. That is, in the configuration shown in FIGS. 13a and 14a, connector 410a connects to connector 405a and connector 410b connects to connector 405b, and in the alternative configuration shown in FIGS. 13b and 14b, connector 410a connects to connector 405b and connector 410b connects to connector 405a. In both alternative configurations the SSDs are functionally connected to controller chip 425.

Another way to describe the potential placements of connectors 405a-b (and corresponding connectors 410a-b) is to envision a rectangle centered about the axis of rotation. Connector 405a may be positioned anywhere on one side of the rectangle so long as connector 405b is positioned on the same relative position on the opposing side with connector 405b rotated 180 degrees such that a line drawn from connector 405a pin 1 to connector 405b pin 1 would cross over axis 1505 and would be bisected by axis 505.

Embodiments may provide for more than two alternative configurations. In an embodiment that provides three alternative configurations, three connectors are positioned about axis 1505 and with any one connector rotated 120 degrees with respect to the other two—envision an equilateral triangle centered about axis 1505 with the connectors occupying the same relative position on each leg. In an embodiment that provides four alternative configurations, four connectors arranged about axis 1505 and with any one connector rotated 90 degrees with respect to the connectors on either end—in this case envision a square centered about axis 1505 with the connectors occupying the same relative position on each leg.

In an embodiment, connectors 405a-b and 410a-b are replaced with a flexible interface (cable) that allows rotation of upper circuit board 325 with respect to lower circuit board 320.

Figure 16:
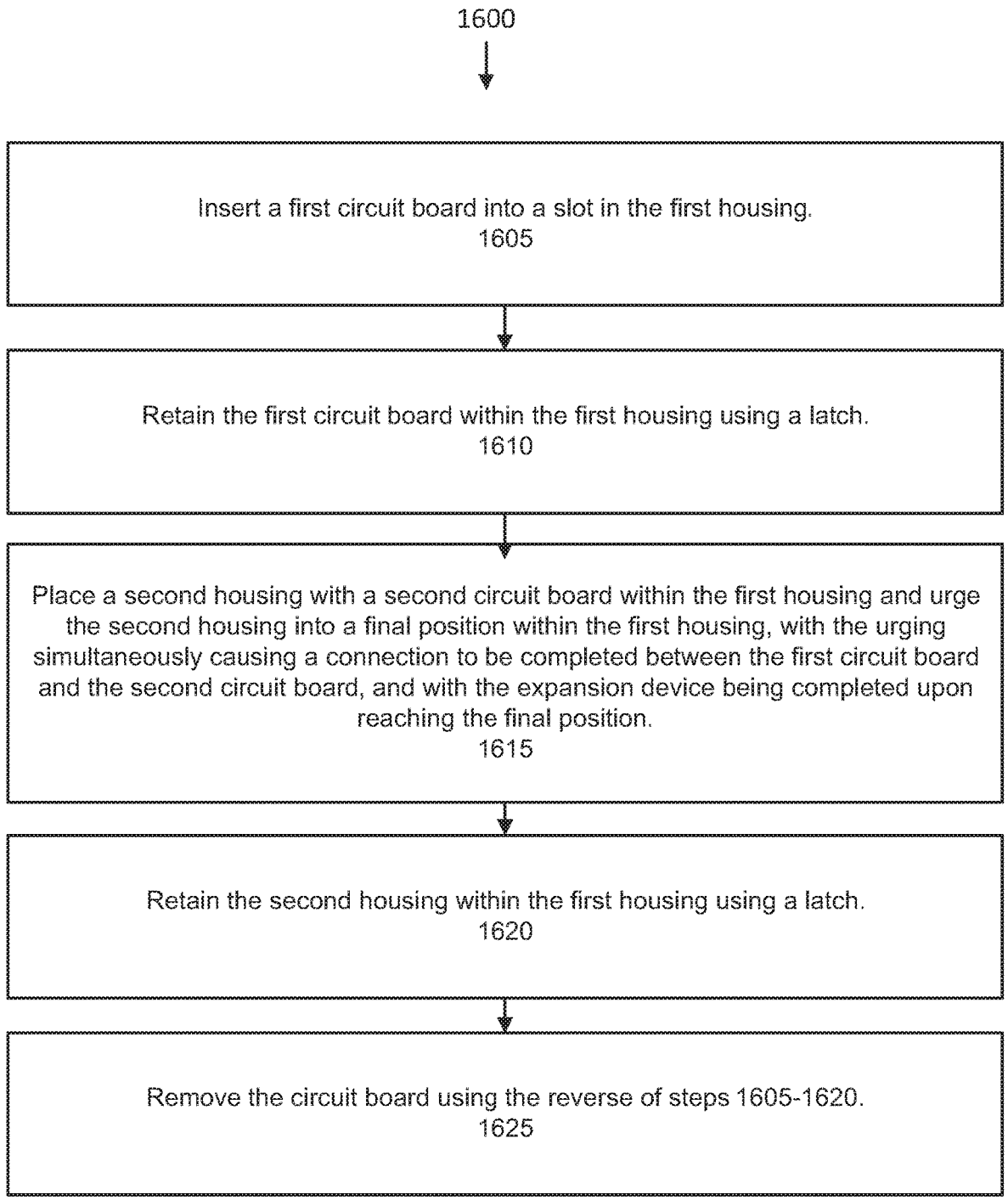
FIG. 16 is a block diagram illustrating an embodiment.

FIG. 16 is a block diagram illustrating an embodiment of a method 1600 of assembling an expansion device without the use of a tool. In FIG. 16, at step 1605, a first circuit board is inserted into a slot in a first housing. In step 1610, the first circuit board is retained within the first housing using a latch. In step 1615, a second housing with a second circuit board is placed within the first housing and the second housing is urged into a final position within the first housing, with the urging simultaneously causing a connection to be completed between the first circuit board and the second circuit board. In step 1620, the second housing is retained within the first housing using a latch, and with the expansion device being completed upon the latching of the second housing to the first housing. In step 1625, the first circuit board is removed using the reverse of steps 1605-1620.

Figure 17:
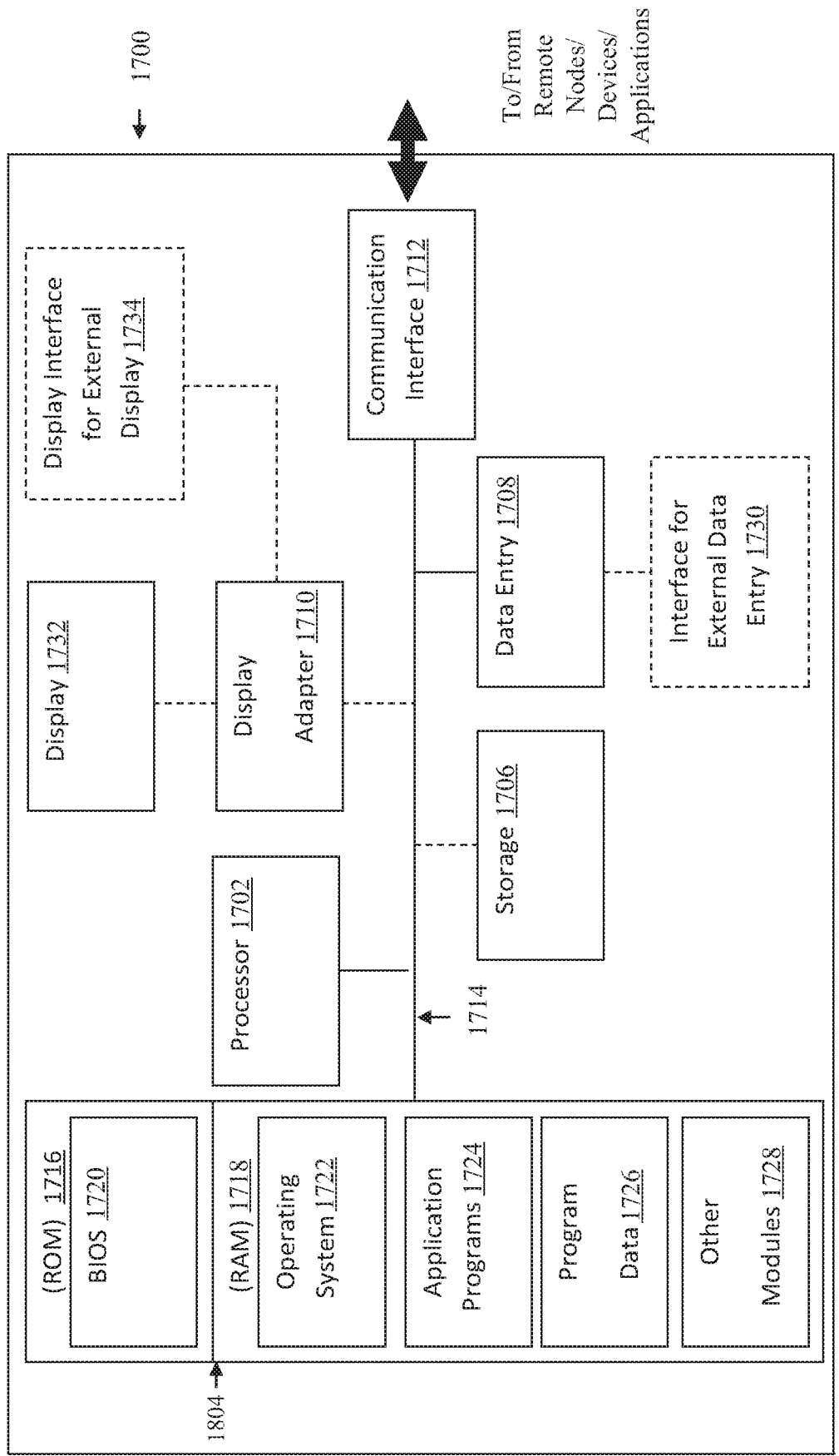
FIG. 17 is a block diagram illustrating an example hardware device for implementing embodiments.

FIG. 17 illustrates an exemplary hardware device in which embodiments matter may be implemented. Those of ordinary skill in the art will appreciate that the elements illustrated in FIG. 17 may vary depending on the system implementation. With reference to FIG. 17, an exemplary system for implementing the embodiments disclosed herein includes a hardware device 1700, including a processing unit 1702, memory 1704, storage 1706, a data entry module 1708, a display adapter 1710, a communication interface 1712, and a bus 1714 that couples the elements 1704-1712 to the processing unit 1702.

The bus 1714 may comprise any type of bus architecture. Examples include a memory bus, a peripheral bus, a local bus, etc. The processing unit 1702 is an instruction execution machine, apparatus, or device and may comprise a microprocessor, a digital signal processor, a graphics processing unit, an application specific integrated circuit (ASIC), a field programmable gate array (FPGA), etc. The processing unit 1702 may be configured to execute program instructions stored in the memory 1704 and/or the storage 1706 and/or received via the data entry module 1708.

The memory 1704 may include read only memory (ROM) 1716 and random access memory (RAM) 1718. The memory 1704 may be configured to store program instructions and data during operation of the hardware device 1700. In various embodiments, the memory 1704 may include any of a variety of memory technologies such as static random access memory (SRAM) or dynamic RAM (DRAM), including variants such as dual data rate synchronous DRAM (DDR SDRAM), error correcting code synchronous DRAM (ECC SDRAM), or RAMBUS DRAM (RDRAM), for example. The memory 1704 may also include nonvolatile memory technologies such as nonvolatile flash RAM (NVRAM) or ROM. In some embodiments, it is contemplated that the memory 1704 may include a combination of technologies such as the foregoing, as well as other technologies not specifically mentioned. When the subject matter is implemented in a computer system, a basic input/output system (BIOS) 1720, containing the basic routines that help to transfer information between elements within the computer system, such as during start-up, is stored in the ROM 1716.

The storage 1706 may include a flash memory data storage device for reading from and writing to flash memory, a hard disk drive for reading from and writing to a hard disk, a magnetic disk drive for reading from or writing to a removable magnetic disk, and/or an optical disk drive for reading from or writing to a removable optical disk such as a CD ROM, DVD or other optical media. The drives and their associated computer-readable media provide nonvolatile storage of computer readable instructions, data structures, program modules and other data for the hardware device 1700. Storage 1706 may utilize an embodiment, particularly an embodiment of expansion device 100, 200, or 300 in which the attached modular devices are SSD modules. However, since embodiments of the expansion device contain other types of devices, embodiments of the expansion device may be used as other purposes, for example, other modules 1728, program data 1726, and application programs 1724, It is noted that the methods for using the systems described herein can be embodied in executable instructions stored in a computer readable medium for use by or in connection with an instruction execution machine, apparatus, or device, such as a computer-based or processor-containing machine, apparatus, or device. It will be appreciated by those skilled in the art that for some embodiments, other types of computer readable media may be used which can store data that is accessible by a computer, such as magnetic cassettes, flash memory cards, digital video disks, Bernoulli cartridges, RAM, ROM, and the like may also be used in the exemplary operating environment. As used here, a "computer-readable medium" can include one or more of any suitable media for storing the executable instructions of a computer program in one or more of an electronic, magnetic, optical, and electromagnetic format, such that the instruction execution machine, system, apparatus, or device can read (or fetch) the instructions from the computer readable medium and execute the instructions for carrying out the described methods. A non-exhaustive list of conventional exemplary computer readable medium includes: a portable computer diskette; a RAM; a ROM; an erasable programmable read only memory (EPROM or flash memory); optical storage devices, including a portable compact disc (CD), a portable digital video disc (DVD), a high definition DVD (HD-DVDTM), a BLU-RAY disc, an SSD, and the like.

A number of program modules may be stored on the storage 1706, the ROM 1716 or the RAM 1718, including an operating system 1722, one or more applications programs 1724, program data 1726, and other program modules 1728. A user may enter commands and information into the hardware device 1700 through the data entry module 1708. The data entry module 1708 may include mechanisms such as a keyboard, a touch screen, a pointing device, etc. Other external input devices (not shown) are connected to the hardware device 1700 via an external data entry interface 1730. By way of example and not limitation, external input devices may include a microphone, joystick, game pad, satellite dish, scanner, or the like. In some embodiments, external input devices may include video or audio input devices such as a video camera, a still camera, etc. The data entry module 1708 may be configured to receive input from one or more users of the hardware device 1700 and to deliver such input to the processing unit 1702 and/or the memory 1704 via the bus 1714.

A display 1732 is also connected to the bus 1814 via the display adapter 1710. The display 1732 may be configured to display output of the hardware device 1700 to one or more users. In some embodiments, a given device such as a touch screen, for example, may function as both the data entry module 1708 and the display 1732. External display devices may also be connected to the bus 1714 via an external display interface 1734. Other peripheral output devices, not shown, such as speakers and printers, may be connected to the hardware device 1800.

The hardware device 1700 may operate in a networked environment using logical connections to one or more remote nodes (not shown) via the communication interface 1712. The remote node may be another computer, a server, a router, a peer device or other common network node, and typically includes many or all of the elements described above relative to the hardware device 1700. The communication interface 1712 may interface with a wireless network and/or a wired network. Examples of wireless networks include, for example, a BLUETOOTH network, a wireless personal area network, a wireless 802.11 local area network (LAN), and/or wireless telephony network (e.g., a cellular, PCS, or GSM network). Examples of wired networks include, for example, a LAN, a fiber optic network, a wired personal area network, a telephony network, and/or a wide area network (WAN). Such networking environments are commonplace in intranets, the Internet, offices, enterprise-wide computer networks and the like. In some embodiments, the communication interface 1712 may include logic configured to support direct memory access (DMA) transfers between the memory 1704 and other devices.

In a networked environment, program modules depicted relative to the hardware device 1700, or portions thereof, may be stored in a remote storage device, such as, for example, on a server. It will be appreciated that other hardware and/or software to establish a communications link between the hardware device 1700 and other devices may be used.

It should be understood that the arrangement of the hardware device 1700 illustrated in FIG. 17 is but one possible implementation and that other arrangements are possible. It should also be understood that the various system components (and means) defined by the claims, described below, and illustrated in the various block diagrams represent logical components that are configured to perform the functionality described herein. For example, one or more of these system components (and means) can be realized, in whole or in part, by at least some of the components illustrated in the arrangement of the hardware device 1700.

In addition, while at least one of these components are implemented at least partially as an electronic hardware component, and therefore constitutes a machine, the other components may be implemented in software, hardware, or a combination of software and hardware. More particularly, at least one component defined by the claims is implemented at least partially as an electronic hardware component, such as an instruction execution machine (e.g., a processor-based or processor-containing machine) and/or as specialized circuits or circuitry (e.g., discrete logic gates interconnected to perform a specialized function), such as those illustrated in FIG. 17.

Other components may be implemented in software, hardware, or a combination of software and hardware. Moreover, some or all of these other components may be combined, some may be omitted altogether, and additional components can be added while still achieving the functionality described herein. Thus, the subject matter described herein can be embodied in many different variations, and all such variations are contemplated to be within the scope of what is claimed.

In the description herein, the subject matter is described with reference to acts and symbolic representations of operations that are performed by one or more devices, unless indicated otherwise. As such, it is understood that such acts and operations, which are at times referred to as being computer-executed, include the manipulation by the processing unit of data in a structured form. This manipulation transforms the data or maintains it at locations in the memory system of the computer, which reconfigures or otherwise alters the operation of the device in a manner well understood by those skilled in the art. The data structures where data is maintained are physical locations of the memory that have particular properties defined by the format of the data. However, while the subject matter is described in this context, it is not meant to be limiting as those of skill in the art will appreciate that various of the acts and operations described herein may also be implemented in hardware.

To facilitate an understanding of the subject matter described, many aspects are described in terms of sequences of actions. At least one of these aspects defined by the claims is performed by an electronic hardware component. For example, it will be recognized that the various actions can be performed by specialized circuits or circuitry, by program instructions being executed by one or more processors, or by a combination of both. The description herein of any sequence of actions is not intended to imply that the specific order described for performing that sequence must be followed. All methods described herein can be performed in any suitable order unless otherwise indicated herein or otherwise clearly.

While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. For example, one skilled in the art will recognize that these embodiments can be practiced without one or more of the specific details, or with other components, systems, etc. And, in other instances, there may be structures or operations not shown, or not described in detail, to avoid obscuring aspects of the described embodiments. Therefore, the scope of the appended claims should be accorded the broadest interpretation so as to encompass all such modifications and similar arrangements.

What is claimed is:

1. An expansion device for containing and connecting a plurality of modular devices to a computing device, the expansion device comprising:
   a housing dimensioned to be exchanged for a single drive within a drive bay and to contain the plurality of modular devices, the drive bay being within the computing device and having a pre-defined size dimensioned to house only the single drive, the housing comprising a first housing part having a first housing latch mechanism and a second housing part having a second housing latch mechanism, the first housing part being secured to the second housing part by the first housing latch mechanism engaging with the second housing latch mechanism; and
   a circuit board secured within the housing, the circuit board including:
   i. a controller chip,
   ii. a plurality of modular device connectors electrically coupled directly to the controller chip by first interface circuitry, and
   iii. an expansion device connector configured to connect to a drive connector in the drive bay and electrically coupled directly to the controller chip by second interface circuitry,
   wherein the first housing part further comprises an inside surface having a plurality of perpendicularly extending cylindrical pins for slidably engaging with a plurality of openings on the circuit board, each cylindrical pin having a distal section, a middle section and a proximal section relative to the inside surface, the middle section having a diameter smaller than a diameter of the distal section, each of the plurality of openings comprising a circular portion and an elongated channel slot portion having a width, the circular portion having a diameter larger than the channel slot width such that the distal and middle sections of each cylindrical pin fit within the circular portion in a first position and slide within the channel slot when the circuit board is moved in a direction parallel to the first housing part into a second position.

2. The expansion device of claim 1, further comprising a plurality of modular devices connected to the plurality of modular device connectors.

3. The expansion device of claim 2, wherein the modular devices comprise a plurality of PCIe modules and the controller chip comprises a PCIe switch.

4. The expansion device of claim 3, wherein the plurality of PCIe modules are selected from the group consisting of a solid state drive (SSD) module, a wireless network module, a GPS module, a GSM module, a LTE module, a WiGig module, a WWAN module, a Gigabit Ethernet LAN module, a Dual Gigabit LAN module, a 2G/3G modem module, a FireWire modules, a SAS Host Bus Adapter module and a SATA RAID module.

5. The expansion device of claim 1, wherein the first housing latch mechanism comprises a first spring element, the second housing latch mechanism comprises a first edge element, such that the first spring element and the first edge element engage when the first housing part is connected to the second housing part.

6. An expansion device for containing and connecting a plurality of modular devices to a computing device, the expansion device comprising:
   a housing dimensioned to be exchanged for a single drive within a drive bay and to contain the plurality of modular devices, the drive bay being within the computing device and having a pre-defined size dimensioned to house only the single drive;
   a first circuit board secured within the housing, the first circuit board including a plurality of modular device connectors electrically coupled to at least one first board connector by first interface circuitry, and a second circuit board secured within the housing including:
   i. a controller chip,
   ii. second interface circuitry electrically coupling the controller chip at least one second board connector configured to electrically couple to the at least one first board connector on the first circuit board, and
   iii. an expansion device connector configured to connect to a drive connector in the drive bay and third interface circuitry electrically coupling the controller chip to the expansion device connector,
   wherein the first housing part further comprises an inside surface having a plurality of perpendicularly extending cylindrical pins for slidably engaging with a plurality of openings on the circuit board, each cylindrical pin having a distal section, a middle section and a proximal section relative to the inside surface, the middle section having a diameter smaller than a diameter of the distal section, each of the plurality of openings comprising a circular portion and an elongated channel slot portion having a width, the circular portion having a diameter larger than the channel slot width such that the distal and middle sections of each cylindrical pin fit within the circular portion in a first position and slide within the channel slot when the circuit board is moved in a direction parallel to the first housing part into a second position.

7. The expansion device of claim 6, further comprising a plurality of modular devices connected to the plurality of modular device connectors.

8. The expansion device of claim 7, wherein the modular devices comprise a plurality of PCIe modules and the controller chip comprises a PCIe switch.

9. The expansion device of claim 7, wherein the plurality of PCIe modules are selected from the group consisting of a solid state drive (SSD) module, a wireless network module, a GPS module, a GSM module, a LTE module, a WiGig module, a WWAN module, a Gigabit Ethernet LAN module, a Dual Gigabit LAN module, a 2G/3G modem module, a FireWire modules, a SAS Host Bus Adapter module and a SATA RAID module.

10. The expansion device of claim 6, wherein the housing comprises a first housing part releasably connected to a second housing part, such that connecting the first housing part to the second housing part results in connecting the at least one first board connector to the at least one second board connector.

11. The expansion device of claim 10, wherein the first housing part further comprises a slot for slidably receiving and securing the first circuit board within the first housing part.

12. The expansion device of claim 10, wherein the first housing part further comprises a slot for slidably receiving and securing the first circuit board within the first housing part, and wherein the second circuit board is secured to the second housing part.

13. The expansion device of claim 6, wherein the first board includes a first connector and a second connector and the second circuit board includes a third connector and a fourth connector such that in a first configuration, the first board connector is connected to the third board connector and the second board connector is connected to the fourth board connector.

14. The expansion device of claim 13, wherein in a second configuration, the first connector is connected to the fourth connector and the second connector is connected to the third connector such that the first board in the second configuration has an orientation that substantially 180 degrees apart from an orientation of the first board in the first configuration.

* * * * *